6/27/78 OR 4,097,727

United States Patent [19]

Ulch

[11] 4,097,727

[45] Jun. 27, 1978

[54] CIRCUIT FOR CONTROLLING AUTOMATIC OFF-LINE OPERATION OF AN ON-LINE CARD READER

[75] Inventor: Bryan D. Ulch, Valencia, Calif.

[73] Assignee: A-T-O Inc., Willoughby, Ohio

[21] Appl. No.: 830,002

[22] Filed: Sep. 1, 1977

[51] Int. Cl.[2] .......................... G06K 5/00; H04Q 3/00

[52] U.S. Cl. ................................. 235/382; 340/152 R

[58] Field of Search ............... 235/431, 380, 375, 382; 340/152 R, 149 A, 149 R, 51

[56] References Cited

U.S. PATENT DOCUMENTS

| | | | |
|---|---|---|---|
| 3,857,018 | 12/1974 | Stark et al. | 235/382 |
| 3,988,570 | 10/1976 | Murphy et al. | 235/382 |
| 4,004,134 | 1/1977 | Hwang | 235/431 |

*Primary Examiner*—Daryl W. Cook

*Attorney, Agent, or Firm*—Knobbe, Martens, Olson, Hubbard & Bear

[57] ABSTRACT

A card or badge is used for controlling access to facilities or facility areas which include remote card readers which are interconnected with a central card data processor. When access is requested at a remote location, a user inserts his card or badge into the remote terminal and the remote terminal sends data identifying the person to the central processor which, in turn, sends a command to the remote terminal to grant or deny access. When a card or badge is inserted into the system and no response is received within a predetermined time period, the remote terminal, on the assumption that communication line failure has occurred between the remote terminal and the central processor, reads a set of data from the user's card or badge to grant or deny facility access to the user on a secondary selection basis.

17 Claims, 2 Drawing Figures

CIRCUIT FOR CONTROLLING AUTOMATIC OFF-LINE OPERATION OF AN ON-LINE CARD READER

BACKGROUND OF THE INVENTION

This invention relates to static magnetic card readers used in systems for controlling access through electrically operable devices, such as doors, turnstiles, printers, etc. More specifically, this invention relates to a system wherein access at plural remote locations is controlled by a central processor and in which limited access is available even when there is a failure in communication lines between remote terminals and the central processor.

In systems in which encoded data on a card or badge are used for controlling access, the card or badge is typically inserted in a slot of a reader, which reads and decodes the encoded data on the card. Advantageously, the data is encoded as a plurality of magnetically polarized spots in a strip of magnetic material. Such encoded data normally includes an identification number or numbers identifying the card holder. During use, this number encoded by the card is compared with a number or numbers stored in the central computer terminal to ascertain whether the individual inserting the card is entitled to access to a building, room, parking lot, or the like. Such cards may also include a secondary set of encoded data which is used when a communication failure between the remote terminal and the central terminal is sensed. Such secondary encoded data typically screens card holders on a different basis than does the central computer terminal, and often allows access to a wider range of personnel, but nevertheless restricts access to a selected group.

In one prior art embodiment the magnetically polarized spots are used to directly actuate a reed relay or other moving switch mechanism located within the reader. The state of the art system is exemplified by U.S. Pat. No. 3,686,479 entitled Static Reader System for Magnetic Cards, assigned to A-T-O Inc., assignee of the present invention, employing electromagnetic solid state sensors disclosed and claimed in U.S. Pat. No. 3,717,749, also assigned to A-T-O Inc. Such systems have been found to be very reliable and are in use as access control systems in a number of different industries, universities, and government installations.

The state of the art in regard to operation of such systems in the event of communication line problems is disclosed and claimed in U.S. Pat. No. 4,004,134, also assigned to A-T-O Inc. Each of the above-referenced patents is hereby incorporated in the present application by the reference.

The system disclosed and claimed in U.S. Pat. No. 4,004,134 incorporates a central processor which periodically and sequentially polls each of the remote terminals in the system. The remote terminals are enabled to transfer data to the central processor only on receipt of a polling pulse. Each of the remote terminals includes a timing system which measures the time between receipt of successive polling signals at that remote terminal from the central processor. If an extended period of time elapses between successive polling pulses, that patent discloses a system for automatically placing the remote terminal in a degraded mode of operation in which a secondary set of card data is read and interpreted to control access at that remote terminal.

While this prior art system has substantial advantage in permitting access during faults in the operation of the system, it will only monitor failures in the polling system or polling communication lines. If the polling system and its communication lines are complete and operating in a normal manner, the degraded mode will not be activated. Thus, if a failure occurs, for example, in the ability of the remote terminal to transmit coded data to the central terminal in response to polling pulses, if a failure occurs in the data transmission lines from the remote terminal to the central processor, or if failures occur in the ability of the central processor to respond with a signal granting or denying access in response to the data from the remote terminal, the system of that patent would not be placed in a degraded mode and the remote terminal would become inoperative. Such an inoperative terminal may even be dangerous in certain circumstances, such as during an emergency, since access through a door might be impossible.

Utilizing the system of the U.S. Pat. No. 4,004,134, furthermore, if a problem existed in the data communication lines or in other systems which did not affect the operation of the polling sequence, a person inserting a card at the remote terminal which should provide access will recognize that the system is not operating. Once individuals at remote terminals can become informed of a non-operational status of the security equipment, the security of the entire system is endangered. Under these circumstances, modifications may be made to a non-working remote terminal by persons wishing to continue future clandestine entry at the remote location.

SUMMARY OF THE INVENTION

The present invention provides a substantial improvement over the system disclosed and claimed in U.S. Pat. No. 4,004,134, and alleviates most of the problems associated with that system in order to provide a card sensing access control system which automatically enters a degraded mode of operation whenever failures occur in any communication lines, or in virtually any part of the central processor or remote terminal. This is accomplished by sensing the insertion of a card at the remote terminal and monitoring the incoming data line for a coded signal specifically granting or denying access to the card holder. in order for such signal to be transmitted to the remote terminal, virtually the entire security system must be operating correctly.

If no signal which specifically authorizes or denies access is received within a predetermined time after card insertion, which time period is calculated to be sufficient to permit such a signal to be transmitted even when the system is operating at its busiest level, the system automatically enters a degraded mode. The degraded mode then permits monitoring of secondary data on the user's card for controlling access at the remote terminal.

More specifically, the remote terminal, after measuring a predetermined time period following the insertion of a data card and without receipt of coded signals granting or denying access, activates a card reader for reading the secondary degraded mode data on the inserted card. If this secondary data matches data stored in a buffer and used for determining who shall have access during degraded mode operation, the system activates a code generator within the remote terminal which transmits directly to the remote terminal logic input line an entry authorization code. This code is identical to that which is normally transmitted by the central terminal to the remote terminal and is thus interpreted by the remote terminal as an authorization code so that entry is permitted.

These and other advantages of the present invention are best understood through the following detailed description of the preferred embodiment which references the drawings, in which:

FIG. 1 is a schematic block diagram of a system incorporating the present invention; and FIG. 2 is a schematic block diagram of an alternate system showing the preferred embodiment of the present invention, that alternate system utilizing a computer program which is disclosed in this application.

DETAILED DESCRIPTION OF THE PREFERRED EMBODIMENT

Figure 1:
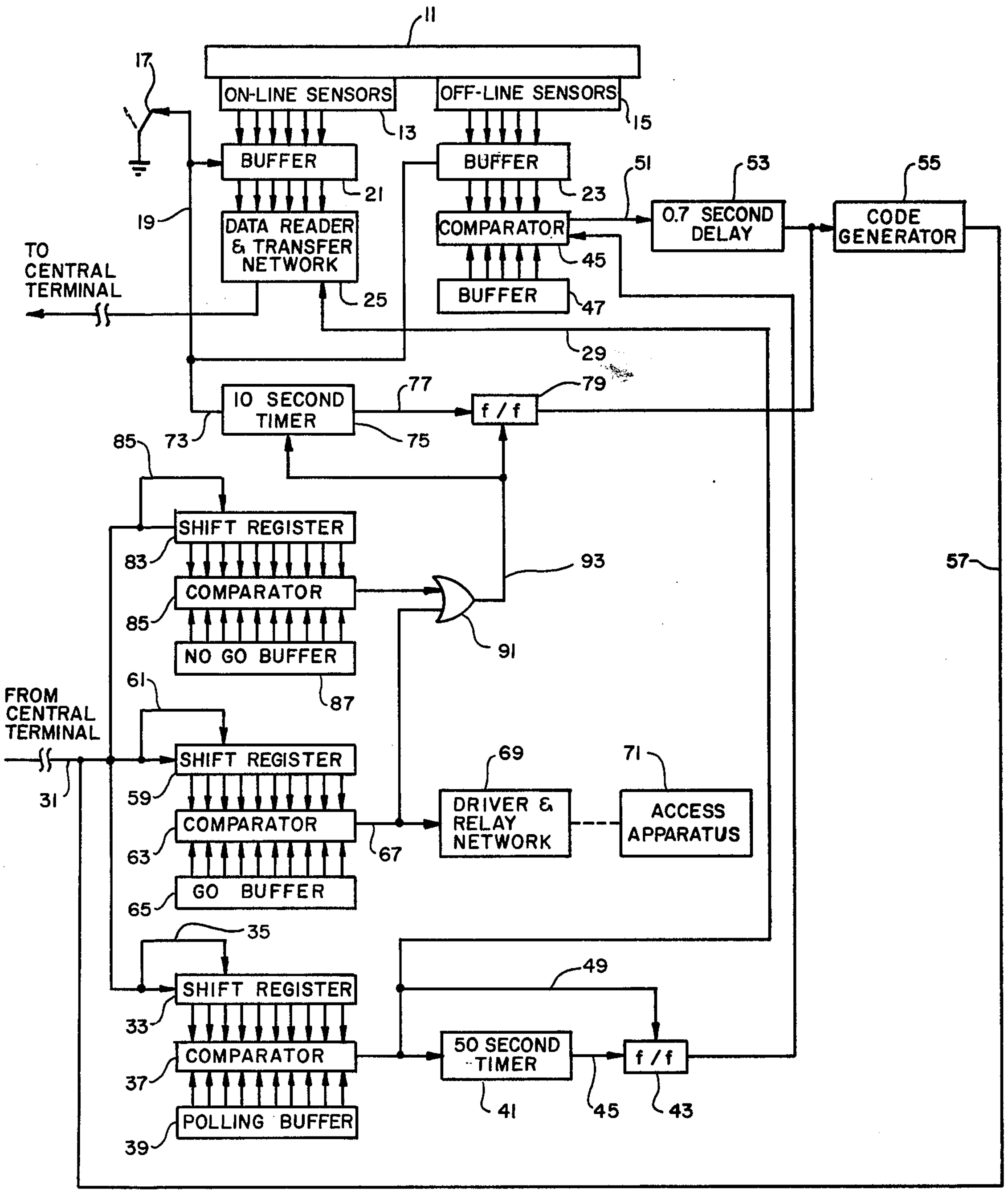

Referring to FIG. 1, it should initially be noted that the circuit of that figure includes, in addition to those elements which permit improved degraded mode performance, the elements disclosed in U.S. Pat. No. 4,004,134. These latter elements, as well as their operation, will be briefly described first, although reference to that patent should be made for a detailed understanding of that portion of FIG. 1.

A magnetically encoded card 11 is provided for insertion by a person wishing to gain access at the remote terminal shown in FIG. 1. The card 11 is inserted into a housing (not shown) within which are a plurality of sensors. The card 11 is spot magnetized so that the poles of all spots are perpendicular to the card faces, and when the card is fully inserted in the housing, each such spot is coaxial with a respective sensor. Sensors employed preferably are the type having a coil wound on a core of saturable material of high initial permeability requiring a sufficiently low magnetomotive force to saturate it that the spot of a card will affect such saturation. See U.S. Pat. Nos. 3,686,479 and 3,717,749, assigned to the same assignee as the present application.

When a voltage pulse is applied to such a coil, the decay thereof is slower in the presence of an opposing spot field than the decay of a pulse in the presence of an adding field. By way of logic devices coupled to the coils, respective binary logic level outputs are derived for the aiding and opposing relationships.

In the drawing, two sets of sensors labeled On-Line Sensors 13 and Off-Line Sensors 15 are shown. Each sensor has one end of its coils connected to a voltage source and the other end of the coils are adapted to be connected to a point of reference or ground potential in a sequence as determined by decoder or switching circuitry to which they are connected. In this regard, when the card 11 is fully inserted in the housing, the inner end of the card actuates a moveable contact of a switch 17 to indicate that the card is in place in the housing. A connection 19 from the switch 17 enables a pair of buffers 21 and 23 so that, once the card 11 is fully inserted and the switch 17 is activated, data from the sensors 13 and 15 is strobed into the buffers 21 and 23 where this data is stored for future use.

The buffer 21 is connected to a data reader and transfer network 25 which is adapted to transfer the data in the buffer 21 to a central processor or terminal, usually in a serial coded fashion, on data line 27. It will be understood, of course, that multiple remote terminals such as that shown in FIG. 1 exist in the overall security system, and each of these remote terminals is connected by means of a data line 27 to the central terminal. When a card 11 is inserted into the remote terminal and the switch 17 is closed by the card, the signal on line 19 enables the buffer 21 and in turn enables the data reader and transfer network 25, so long as an enable signal is present on line 29, as will be explained in more detail below. In response to these enabling signals, the data reader and transfer network 25 transmits the data from the on-line sensors 13 to the central terminal.

As mentioned above, the central terminal is directly coupled to each of a plurality of remote terminals, each constructed as shown in FIG. 1, and repeatedly transmits polling pulses to these remote terminals in succession. Each such polling pulse conditions a particular remote terminal to transfer to the central terminal any data being read from a card that is in place. If there is no card in place so that no data is being read by the sensors 11 and 15, the polling pulse terminates and the next remote terminal in sequence is polled. If a card is in place, the first polling pulse occurring after actuation of the switch 17 will enable the remote terminal to transmit data to the central processor.

All signals received from the central processor, including polling signals, are clocked into a shift register 33 by a self-clocking connection 35 in typical fashion, and are automatically compared in a comparator 37 with a data word stored in a polling buffer 39. The buffer 39 contains the proper polling command for this remote network. If the signal received on line 31 is a polling command for the remote terminal shown in FIG. 1, an output signal will be provided by the comparator 37 indicating the identity between the signal and the word stored in the buffer 39. The signal on line 37 starts a fifty-second timing period of a timer 41. Successive polling inquiries from the central terminal are expected to be received on line 31 at more frequent intervals than fifty seconds and thus the fifty-second timer will be initiated by a new signal on line 37 successively, over and over again, at periods of time shorter than fifty seconds, so that the timer 41 will never time out. If a polling signal is not received within the fifty-second time period, indicating a failure in the polling system, the timer 41 will time out, setting a flip-flop 43 by means of a signal on line 45. The flip-flop 43, in its set condition will, in turn, enable a comparator 45 to make a comparison between the degraded mode or off-line data from sensors 15 stored in the buffer 23 and data permanently stored in a buffer 47 defining that group of personnel which will be granted access during degraded mode operation.

Once a polling signal is again received from the central terminal, a signal on line 37 will again start the timer 41 and, by means of line 49, will reset the flip-flop 43 to place the system in a normal operation mode by deactivating the comparator 45.

Once activated, the comparator 45 will output a signal on line 51 if the card 11, as read by the sensor 15, compares identically with the data in the buffer 47. The signal on line 51 will begin a 0.7-second delay introduced by a timer 53 and will thereafter enable a code generator 55 which provides on line 57 a code identical to the access authorization code expected from the central terminal on line 31. Thus, the line 57 is connected directly to the line 31, and data from the generator 55 will be clocked into a shift register 59 through a self-clocking connection 61. Once in the shift register 59, this command data will be compared in a comparator 63 with data permanently stored in a buffer 65. The data in the buffer 65 is identical to the access authorization code, and thus the code from line 57 will produce a signal on line 67 indicating that access is to be permitted.

It will be understood, of course, that if the system is operating normally, data transferred to the central terminal from the data reader and transfer network 25 will produce a signal authorizing access if the holder of the particular card 11 is to be permitted access at this remote terminal. This authorization signal will be communicated from the central processor on line 31 to the shift register 59 in the same manner as the signal on the line 57. Thus, the remote terminal of FIG. 1 cannot differentiate at this point between an actual authorization signal and an authorization signal generated by the degraded mode sensor 15, and provides a signal on line 67 which operates a driver and relay network 69 providing a mechanical or electrical output to give access at the access apparatus 71 (such as a solenoid operated door strike).

The system thus far described is substantially identical to that described and claimed in U.S. Pat. No. 4,004,134. It will be seen that the described portion of FIG. 1 monitors for successive polling pulses and will place the system in a degraded mode operation, utilizing the sensor 15, if successive polling pulses are not received. Failure in the line 27, or failure of the central terminal to properly respond to data from the data reader and transfer network 25 will not, however, activate that portion of the system, and degraded mode operation will not be initiated in response to such failures. It should be noted that the 0.7-second delay introduced by the time 53 assures that the person inserting the card 11 cannot tell that the system is in degraded mode. Thus, under normal operation, it takes a predetermined period of time for the apparatus to be polled, to transmit its data from the unit 25, to receive data on line 31, to compare this data in the comparator 63, and to provide access at the access apparatus 71. This same time is simulated by the delay timer 53 so that, even in degraded mode, a 0.7-second time period will elapse between insertion of the user's card 11 and access. Thus, if the user was among the group to be granted access during normal operation, he cannot determine whether the system is in its normal or degraded mode.

While the delay introduced by the timer 53 is described as 0.7 seconds, it should be understood that this delay may be any length sufficient to mask (to the user) the fact that communication failure has occurred. Furthermore, in the computerized embodiment described at the end of this specification, this delay is 50 milliseconds.

The apparatus added to the system of FIG. 1 by the present invention permits a more thorough monitoring of the overall system operation, including a monitoring of the line 27 as well as most of the system components, to place the system in a degraded mode when any portion of the system fails. The operation of this improved apparatus is based upon a requirement that, in response to insertion of card 11 into the system, a specific signal authorizing or denying access at this remote terminal must be received on the line 31 within a predetermined period of time. If no such signal is received in response to a card insertion, the degraded mode is automatically entered. The system thus monitors the entire security system by looking at the initial event, that is, the insertion of the card 11, and the final expected event, that is, the receipt of an authorization code on the line 31, and provides a predetermined time period during which this entire sequence must occur under the most unfavorable circumstances (that is, when the system is at its busiest level, due to communication from plural remote terminals). Failure in any portion of the system will thus activate the degraded mode and permit access to a user on the assumption that a portion of the security system is not properly functioning.

Specifically, insertion of a card 11 closes the switch 17 which, by means of line 73, initiates a 10-second timer 75. This timer 75 sets the predetermined time period during which a response must be received after the card 17 is inserted. If the timer 75 times out, that is, if 10 seconds elapses after receipt of the signal on line 73, the timer 75 will produce a signal on line 77 setting a flip-flop 79. The flip-flop 79, when set, provides a signal on line 81 which energizes the code generator 55 to provide an access authorization signal as previously described. It will be noted that 0.7-second delay network 53 has been bypassed in this circumstance, since a delay has already been introduced by the 10-second timer 75. Thus, the 10-second timer 75 masks the fact that a degraded mode operation is being undertaken by the system.

Receipt of a signal from the central terminal on line 31 will be compared in the comparator 63, as previously indicated, to determine whether the signal is an authorization code. At the same time, the signals on line 31 will be shifted into a shift register 83 by self-clocking connection 85 and will be compared in a comparator 85 with an access denial instruction stored in a buffer 87. It will be seen that, in response to insertion of a card, either an authorization or a denial is expected on the line 31, and thus one of the comparators 63 and 85 is expected to provide an output signal. The outputs of comparators 63 and 85 on lines 67 and 89, respectively, are combined in an OR gate 91 which is utilized to reset the flip-flop 79 (if the degraded mode has previously been entered) and is also used to reset the 10-second timer 75. Thus, once operation of the 10-second timer 75 is initiated, if an authorization or denial code which favorably compares with the data stored in the buffers 65 and 87 is received on line 31 within 10 seconds, the signal from the OR gate 91 on line 93 will reset the timer 75 so that it will not time out. In this circumstance, the timer 75 will not provide a set signal on line 77 for the flip-flop 79, and the degraded mode will not be entered.

Even when the system is in degraded mode, insertion of a card will again close the switch 17 and initiate operation of the 10-second timer, so that, if the problem with the communication lines has been corrected, a signal will be received on line 31 which will provide an input to the OR gate 91 to reset the timer 75 and the flip-flop 79, the latter resetting operation placing the system once again in its normal operational mode.

While the signal from switch 17 has been described as initiating the timing period of timer 75, those skilled in the art will recognize that other events could begin the timing sequence. Thus, for example, completion of the data transmission from the transfer network 25 could be used for this purpose.

From the foregoing description, it can be seen that virtually the entire system is checked by this improved system, and the degraded mode will be entered upon failure to receive a proper authorization or denial code from the central processor in response to card insertion.

Figure 2:
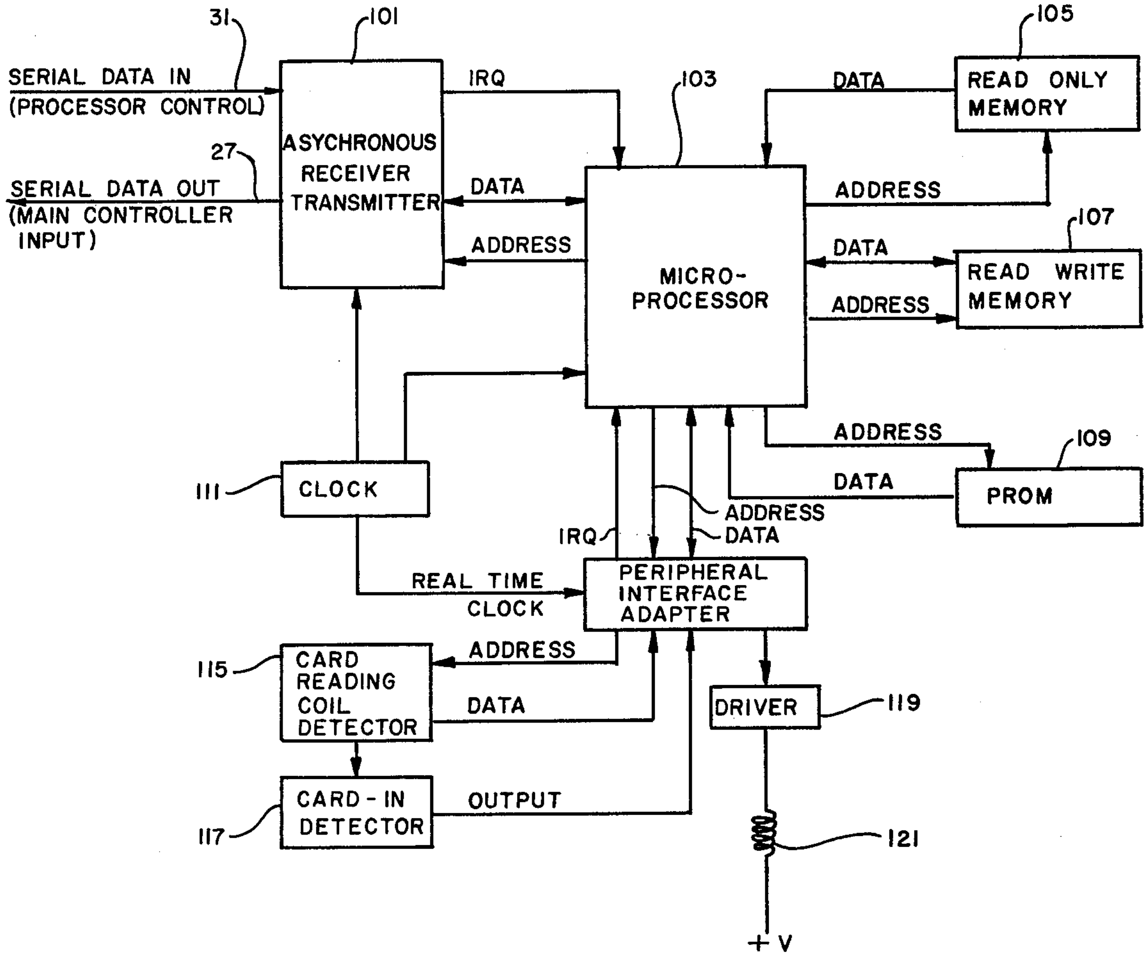

While the system described in reference to FIG. 1 is adequate for operating this degraded mode system, the preferred embodiment incorporates a programmed microprocessor. This preferred system is shown in FIG. 2 and includes an asynchronous receiver/transmitter 101 connected to the polling and data line 31 as well as the line 27, the output and input lines, respectively, for communicating with the central processor. The receiver/transmitter, in the preferred embodiment, is sold by Motorola Electronics under Part No. MC6850. The receiver/transmitter 101 is connected by a two-directional communication link to a microprocessor 103 sold by Motorola Electronics under Part No. MC6800. The processor 103 is interconnected in a well-known manner with a read only memory 105 sold by Signetics under Part No. 2616, a read and write memory 107, sold by Motorola Electronics under Part No. MCM6810AL and a programmable read only memory 109, sold by Intersil under Part No. IM5610. A program listing is stored in the read only memory 105 and is included at the end of this specification. The receiver/transmitter 101, microprocessor 103 and a peripheral interface adapter are interconnected in a known manner to a master clock 111 which provides timing signals for the entire system. In addition, the microprocessor 103 is connected to the peripheral interface adapter 113 sold by Motorola Electronics under Part No. MC6820. This interface adapter 113 is, in turn, connected to the coil detector 115, described and claimed in U.S. Pat. Nos. 3,686,479 and 3,717,749, to a card in detector switch 117 identical to the switch 17 of FIG. 1 and a driver and relay network 119 for operating an access apparatus 121, which are identical, respectively, with the units 69 and 71 described and referenced to FIG. 1.

The program which operates the system of FIG. 2 and which is stored in the read only memory 105 is as follows:

```
;************************************************
;**                                           ***
;**                                           ***
;**                 PORTER                    ***
;**                                           ***
;**                                           ***
;*******************************************JSD***
;*******************************************GFH***
;
;
;  COPYRIGHT (C)  1976
;  RUSCO ELECTRONIC SYSTEMS
;  GLENDALE, CALIFORNIA
;
;
;  PORTER IS A SOFTWARE PACKAGE TO DRIVE AN
;  M6800 CONTROLLED BADGE READER.
;
;
;
;  BIT MASKS
;
; THESE MASKS ARE USED TO TEST AND SELECT
; INDIVIDUAL BITS IN A BYTE
;
; FIRST, THE OPTION BITS
;
```

```
        ;** FIRST OPTION BYTE
0080    O.DOD   =       $80     ;DOOR OPEN DETECT
0040    O.DM    =       $40     ;DEGRADED MODE+EQUIV
0020    O.AS    =       $20     ;ALARM SHUNT / DOD TIME
0010    O.NG    =       $10     ;"NO/GO" RELAY
0008    O.IMP   =       $08     ;IMPERATIVE GO/NG CMDS
0004    O.TMP   =       $04     ;TAMPER SWITCH
0002    O.ELEV  =       $02     ;ELEVATOR READER
0001    O.IDEK  =       $01     ;WE ARE AN IDEK READER
        ;** NOW FOR THE SECOND BYTE OF OPTIONS
0080    O.IDO   =       $80     ;IDEK C/CK/L OVERRIDE
0040    O.ERAN  =       $40     ;ERROR ANNUNCIATOR
0020    O.DUR   =       $20     ;DURESS RELAY
        ;
        ; NOW FOR THE RELAY BITS
        ;
0080    R.GO    =       $80
0040    R.NG    =       $40
0020    R.AS    =       $20     ;ALARM SHUNT
        ;
        ;  SOME OPDEFS TO FIX UP SCREWED INSTRUCTION NAMES
        ;
        ;
        PION    MACRO   ;TURN ON INTERRUPTS
                CLI
                ENDM
        ;
        PIOFF   MACRO   ;TURN OFF INTERRUPTS
                SEI
                ENDM
        ;
0010    R.ERAN  =       $10     ;ERRAN
0008    R.DUR   =       $08     ;DURESS RELAY
        ;
        ; NOW FOR THE EXTERNAL SWITCHES
        ; (THESE ARE BITS WITHIN THE WORD S.XXX)
        ;
0010    X.TMP   =       $10     ;TAMPER SWITCH
```

```
0020   X.DOD   =      $20   ;DOOR-IS-OPEN SWITCH
0040   X.AS    =      $40   ;SHUNT REQUEST PUSHBUTTON
                             SWITCH
       ;
       ;
       ;
       ;  DELAY CONSTANTS
       ;
       ;
       ;  THE COUNTERS IN THE FOREGROUND ROUTINE
       ;  ARE CLOCKED ONCE EVERY 6.666666666
       ;  MILLISECONDS (150 TIMES A SECOND).
       ;  EACH COUNTER IS A TWO BYTE COUNTER, AND
       ;  IS INCREMENTED ON EACH CLOCK TICK.
       ;  TIMEOUT OCCURS WHEN COUNTER OVERFLOWS
       ;  TO ZERO.
       ;
       ;
FFF8   T.50MS  =      -8     ;50 MILLISECONDS
FF6A   T.01S   =      -150   ;1 SECOND
FE3E   T.03S   =      -450   ;3 SECONDS
FA24   T.10S   =      -1500  ;10 SECONDS
EE6C   T.30S   =      -4500  ;30 SECONDS
       ;
       ;
       ;  DELAY COUNTERS
       ;
       ;
       ;  THESE TWO BYTE COUNTERS ARE INCREMENTED
       ;  ON EVERY CLOCK TICK.  WHEN ONE OF THEM
       ;  CLOCKS TO ZERO, THE ASSOCIATED COMPLETION
       ;  ROUTINE IS CALLED.
       ;
       ;  IF A COUNTER IS ZERO, IT STOPS
       ;
0000                 ZSECT          ;DEFINE VARIABLES
       0000   CNTRS  =       *
0000          DMCNTR: BLOCK   2
```

```
0002        GXCNTR: BLOCK   2       ;(!)SET BY GOON, GXOFF; WAKES
                                     GXOFF
0004        NXCNTR: BLOCK   2       ;SET BY NGON, NXOFF; WAKES NXOFF
0006        DUCNTR: BLOCK   2
0008        ERCNTR: BLOCK   2
000A        ASCNTR: BLOCK   2       ;(!)SET BY GOOFF; WAKES
                                     RLYOFF(20)
000C        NGCNTR: BLOCK   2       ;SET BY NGON; WAKES RLYOFF(40)
000E        GOCNTR: BLOCK   2       ;(!)SET BY GOON; WAKES GOOFF
0010        EQCNTR: BLOCK   2       ;(!)SET WHEN CARD DATA SENT
            ;               ;WAKES EQUIV

0012        OPCNTR: BLOCK   2       ;(!)SET BY OPEN; WAKES GOON
0014        UNCNTR: BLOCK   2       ;SET BY C.UNLK; WAKES UNON
0016        DOCNTR: BLOCK   2       ;SET BY DOD, WAKES DODTIM
            ; NOTE: (!) MEANS CLEARED BY NOTIME
      0018  NCNTRS  =       *-CNTRS ;NUMBER OF **BYTES** OF COUNTERS
            ;
            ;  STATE FLAGS
            ;
            ;
            ;  SOME BYTES TO INDICATE THE CURRENT MACHINE
            ;  STATE AND THE RESULTS OF PROCESSING A CARD
            ;  ENTRY.
            ;
0018        TMPFLG: BLOCK   1
0019        DODFLG: BLOCK   1
001A        UNLFLG: BLOCK   1
001B        KBDFLG: BLOCK   1
001C        LCLFLG: BLOCK   1
001D        APBFLG: BLOCK   1
001E        DMFLG:  BLOCK   1
001F        CRDFLG: BLOCK   1
            ;
            ;
            ;
            ; KEYBOARD DATA TABLES
            ;
```

```
0020  KEYTAB: BLOCK   4      ;KEYTAB, KEYCNT & DURESF MUST BE
0024  KEYCNT: BLOCK   1      ;CONSECUTIVE
0025  DURESF: BLOCK   1
0026  KEYFLG: BLOCK   1
0027  OLDKEY: BLOCK   1
0028  MASTER: BLOCK   4              ;CARD DIGIT INDICES
002C  MASHER: BLOCK   4      ;""" BUT UNPERMUTED
0030  MATCH:  BLOCK   1
      ;
      ; CARD DATA BUFFER
      ;
0031  DIGTAB: BLOCK   8
      ;
      ;  ERROR RETRIES ID AND COUNT
      ;
0039  NTRIES: BLOCK   1
003A  RTLBUF: BLOCK   7
      ;
      ;  XREG
      ;
      ;
      ;  SAVE AREAS FOR X BECAUSE YOU CAN'T
      ;  SAVE IT ANY OTHER WAY
      ;
0041  XREG0:  BLOCK   2
0043  XREG1:  BLOCK   2
0045  SCNPTR: BLOCK   2
0047  DIGPTR: BLOCK   2
0049  COMBX:  BLOCK   2
004B  MIXPTR: BLOCK   2
      ;
      ;
      ;
      ;  FPROM AND I/O ADDRESSES
      ;
      ;
      ;
```

```
       0080  FPROM    =        $80      ;FPROM OPTIONS
       0084  SCNTAB   =        $84      ;COIL ADDR TABLE
             ;
       00A4  BUFA     =        $A4      ;PIA COIL ADDRESSES
       00A5  CSRA     =        BUFA+1
       00A6  BUFB     =        BUFA+2   ;PIA RELAYS
       00A7  CSRB     =        BUFA+3
             ;
       00A8  ACSTAT   =        $00A8    ;ACIA STATUS PORT
       00A9  ACDATA   =        ACSTAT+1         ;ACIA I/O PORT
             ;
       00E0  ROW0     =        $00E0            ;KEYBOARD SWITCH ROW
             ; DIP SWITCH ADDRESSES
00C3                   ASECT   $00C3
       00C3  S.XXX    = *      ;EXTERNAL SENSOR SWITCHES
00C3         S.IDEK:  BLOCK    1        ;C/CK BIT AND # OF ERRORS
00C4         S.COMB:  BLOCK    1        ;PERMUTATION & COMBINATION
00C5         S.SYS:   BLOCK    1        ;SYSTEM CODE
       00C6  S.AS     = *      ;AS/DOD TIMER COUNT
00C6         S.VTD:   BLOCK    1        ;VTD TIMER COUNT
             ;
             ;
             ;  RESET AND INTERRUPT VECTORS
             ;
             ;
0FF8                   ASECT   $0FF8
0FF8                   WORD    RTC      ;REAL TIME CLOCK
0FFA                   WORD    $FC04    ;SWI TO KERNEL
0FFC                   WORD    $FC00    ;NMI TO KERNEL
0FFE                   WORD    BACK     ;RESET TO BACKGROUND
             ;
             ;
             ;
             ;**************************************************
             ;
             ;  RTC
             ;
             ;
```

```
;**************************************************
;
; ALL TASKS WHICH REQUIRE TIME DELAYS AND ALL
; PARAMETERS REQUIRING CONTINUOUS MONITORING
; ARE HANDLED BY THIS SET OF ROUTINES.
; SPECIFICALLY, THIS MODULE HANDLES THE
; FOLLOWING TASKS:
;
;       TAMPER SWITCH MONITORING
;       DOOR OPEN PUSHBUTTON MONITORING
;       DOOR OPEN DETECT
;       RELAY ACTIVATION SEQUENCES
;       RELAY CLOSURES AFTER TIME DELAY
;       DEGRADED MODE TIMEOUT
;       DEAD MAN SET
;       CARD EDGE DETECT
;
;
; DEFINE MODULE STARTING ADDRESS
;
;
0000                    PSECT
;
;
;       RTC
;
;
;       THIS IS THE MAIN SERVICE ROUTINE FOR THE REAL
;       TIME CLOCK INTERRUPTS.  A RISING EDGE OF THE
        CLOCK
;       FORCES AN IRQ INTERRUPT WHICH VECTORS TO RTC.
;       RTC IN TURN CALLS SUBROUTINES TO EXECUTE THE
;       VARIOUS TASKS THAT NEED SERVICING ONE AT A TIME.
;
;
0000 96 A6      RTC:    LDAA    BUFB    ;CLR INTERRUPT AT PIA
;
```

```
0002 86 3C              LDAA    #$3C    ;SET DEAD MAN HIGH
0004 97 A5              STAA    CSRA
                 ;
0006 BD 022C            JSR     KEYSER  ;SCAN KEYBD
                 ;
0009 BD 001C            JSR     CRDEDG  ;CHK FOR CRD IN
                 ;
000C BD 0093            JSR     APB     ;CHK DOOR OPEN PUSHBUTTON
                 ;
000F BD 0041            JSR     TAMPER  ;CHECK TAMPER SWITCH
                 ;
0012 BD 005F            JSR     DOD     ;CHECK DOOR OPEN DETECT
                 ;
0015 BD 00B4            JSR     LCLSW   ;SEE IF IDEK MODE SWITCH CHANGED
                 ;
0018 BD 00BE            JSR     CNTDN   ;COUNT DOWN SERVICE TIMERS
                 ;
001B 3B                 RTI             ;RETURN TO BACKGROUND TASK
                 ;
                 ;
                 ;
                 ;  CRDEDG
                 ;
                 ;
                 ;  CHECKS FOR CARD, SETS CRDFLG ACCORDINGLY
                 ;
                 ;        00  NO CARD
                 ;        01  CARD IN, NOT YET PROCESSED
                 ;        FE  CARD IN, ALREADY PROCESSED
                 ;
001C 96 1FZ      CRDEDG: LDAA    CRDFLG
001E 26 12 =             BNE CRDOUT
                 ; HERE IF THE CARD WAS NOT IN LAST TIME
0020 96 A6               LDAA    BUFB
0022 84 01               ANDA    #$01
0024 27 1A =             BEQ     CRDDN
0026 97 1FZ              STAA    CRDFLG  ;PUT A 1 INTO CRDFLG
```

```
                ; CLEAR KEYTAB, KEYCNT AND DURESF
0028 CE 0006            LDX     #6              ;NUMBER OF BYTES TO CLEAR
002B 4F                 CLRA
002C A7 1FZ     CRDINL: STAA    KEYTAB-1,X
002E 09                 DEX
002F 26 FB =            BNE     CRDINL
0031 39                 RTS
0032 96 A6      CRDOUT: LDAA    BUFB    ;FLAG CARD REMOVAL
0034 84 01              ANDA    #$01
0036 26 08 =            BNE     CRDDN
0038 7F 001F            CLR     CRDFLG
                ; STOP EQUIVOCATION SO EQUIV DOESN'T HAVE TO
                ; CHECK CRDFLG
003B CE 0000            LDX     #0
003E DF 10Z             STX     EQCNTR
                ;
0040 39         CRDDN:  RTS
                ;
                ;
                ;
                ;       TAMPER
                ;
                ;
                ;       THIS ROUTINE GETS CALLED ON EACH CLOCK TICK,
                        CHECKS
                ;       THE TAMPER SWITCH, AND SETS A FLAG TO DENOTE ANY
                ;       STATE CHANGE.
                ;       THE FOUR STATES OF THE FLAG ARE DESCRIBED BELOW:
                ;
                ;       00      SWITCH OPEN
                ;       01      SWITCH CLOSED, CHANGE NOT YET XMITTED.
                ;       FE      SWITCH CLOSED
                ;       FF      SWITCH OPEN, CHANGE NOT YET XMITTED.
                ;
                ;       THIS ROUTINE CAN CAUSE TRANSISTIONS FROM 00 TO 01
                ;       OR FE TO FF.
                ;
                ;
```

```
0041 96 80    TAMPER: LDAA    FPROM   ;CHECK IF OPTION IN
0043 84 04            ANDA    #O.TMP
0045 27 17 =          BEQ     TMPDN
                ;
0047 D6 C3            LDAB    S.XXX   ;READ SWITCH
0049 96 18Z           LDAA    TMPFLG  ;TEST SIGN OF TAMPER FLAG
004B 2B 09 =          BMI     TMINUS
                ;
004D C4 10            ANDB    #X.TMP  ;IF PLUS AND IF SW IS CLOSED
004F 27 0D =          BEQ     TMPDN   ;SET FLAG TO 01
0051 86 01            LDAA    #$01
0053 97 18Z           STAA    TMPFLG
0055 39               RTS
                ;
0056 C4 10    TMINUS: ANDB    #X.TMP  ;IF MINUS AND IF SWITCH OPEN,
0058 26 04 =          BNE     TMPDN   ;SET FLAG TO FF
005A 86 FF            LDAA    #$FF
005C 97 18Z           STAA    TMPFLG
                ;
       005EP  TMPDN   =       *
005E 39       RTS3:   RTS
                ;
                ;
                ;       DOD
                ;
                ;
                ;       DOD CHECKS DOOR SWITCH ON EACH CLOCK TICK
                ;       SETS AND CLEARS THE DOCNTR TIMER SO THAT
                ;       IF THE DOOR STAYS OPEN LONGER THAN THE TIME
                ;       SPECIFIED IN THE DOD TIME SWITCHES
                ;       'DODTIM' IS CALLED TO SET THE FLAG
                ;
                ;       THE MEANINGS OF THE FLAG ARE:
                ;
                ;       00 SWITCH CLOSED
                ;       01 SWITCH OPEN, CHANGE NOT YET XMITTED
                ;       FE SWITCH OPEN
                ;       FF SWITCH CLOSED, CHANGE NOT YET XMITTED
```

```
                ;
                ;       THIS ROUTINE SETS IT FROM OPEN TO C,NX
                ;       DODTIM SETS IS FROM CLOSED TO O,NX
                ;
005F 96 80      DOD:    LDAA    FPROM   ;CHECK FOR DOD OPTION
0061 84 80              ANDA    #O.DOD
0063 27 25 =            BEQ     DODONE  ;NOT BOUGHT
                ;
0065 96 C3              LDAA    S.XXX   ;READ SWITCHES
0067 84 20              ANDA    #X.DOD  ;LOOK AT DOD SWITCH
0069 27 11 =            BEQ     DOORCL  ;SWITCH WAS CLOSED
                ;
006B DE 16Z             LDX     DOCNTR  ;SEE IF TIMER ALREADY SET
006D 26 1B =            BNE     DODONE  ;YES...DO NOT KRUMP!
                ; HERE TO SET THE TIMER
006F CE 0016            LDX     #DOCNTR ;POINTER PASSED TO CALCT
0072 96 C6              LDAA    S.AS    ;GET TIME IN SECONDS 0-15
0074 44                 LSRA
0075 44                 LSRA
0076 44                 LSRA
0077 44                 LSRA            ;MOVE NUMBER INTO 4 LSBITS
0078 48                 ASLA            ;MULT BY TWO
0079 7E 0213            JMP     CALCT   ;CONVERT FROM SECS & STORE IN
                                         DOCNTR
007C CE 0000    DOORCL: LDX     #0
007F DF 16Z             STX     DOCNTR  ;CANCEL DODTIM REQUEST...ALL
                                         IS WELL
0081 96 19Z             LDAA    DODFLG  ;SEE IF WE JUST MADE A
                                         TRANSITION TO CLOSED
0083 81 FE              CMPA    #$FE    ;WERE WE FULLY OPEN??
0085 26 03 =            BNE     DODONE  ;NOPE
0087 7C 0019            INC     DODFLG  ;SET TO FF, MEANING WE JUST
                                         CLOSED
008A 39         DODONE: RTS
                ;
                ;*******
                ; HERE WHEN DOOR OPEN TOO LONG
                ; SET DODFLG FROM FE TO FF
```

```
008B 96 19Z    DODTIM: LDAA    DODFLG  ;CHECK OLD VALUE
008D 26 FB =           BNE     DODONE  ;WAS NOT 00=CLOSED...ERGO,
                                        DO NOT SET OPEN
008F 7C 0019           INC     DODFLG  ;SET TO 01...TELL CONSOLE WE
                                        OPENED
0092 39                RTS
               ;
               ;
               ;  APB
               ;
               ;
               ;  CHECKS DOOR OPEN PUSHBUTTON.  CAUSES DOOR OPEN
               ;  SEQUENCE WHEN CLOSURE IS DETECTED IF PUSHER'S
               ;  FINGER HAS RIGHT SYSTEM CODE
               ;
0093 96 80     APB:    LDAA    FPROM   ;CHK FOR AS OPTION
0095 84 20             ANDA    #O.AS
0097 27 1A =           BEQ     APBD
               ;
0099 96 1DZ            LDAA    APBFLG  ;IGNORE SWITCH IF
009B 26 0D =           BNE     APX     ;ALREADY SERVICED
               ;
009D 96 C3             LDAA    S.XXX   ;OPEN DOOR IF SWITCH
009F 84 40             ANDA    #X.AS   ;IS PUSHED
00A1 26 10 =           BNE     APBD
00A3 BD 012A           JSR     OPEN
00A6 7C 001D           INC     APBFLG  ;FLAG AS SERVICED
00A9 39                RTS
               ;
00AA 96 C3     APX:    LDAA    S.XXX   ;CLR FLAG WHEN SWITCH
00AC 84 40             ANDA    #X.AS   ;IS RELEASED
00AE 27 03 =           BEQ     APBD
00B0 7F 001D           CLR     APBFLG
00B3 39        APBD:   RTS
               ;
               ;
               ;  LCLSW
               ;
```

```
                ;
                ;  SCANS LOCAL MODE SWITCH AND SETS LOCAL MODE
                ;  TO KEYBOARD OR NOKEYBOARD ACCORDINGLY.
                ;  WORKS IF AND ONLY IF A MODE HAS NOT BEEN
                ;  FORCED BY THE CONSOLE.
                ;
00B4 96 1CZ     LCLSW:  LDAA    LCLFLG  ;CHECK FOR LOCAL MODE
00B6 81 00              CMPA    #$00
00B8 27 03 =            BEQ     LCLRTS
                ;
00BA BD 03E4            JSR     ILKL    ;FORCE KBD OR NOKBD
                ;
00BD 39         LCLRTS: RTS
                ;
                ;
                ;
                ;       CNTDN
                ;
                ;       EVERY TASK INVOLVING A TIME DELAY HAS A
                ;       COUNTER ASSOCIATED WITH IT. THESE TWO BYTE
                ;       COUNTERS ARE LOADED WITH A NUMBER TO ACTIVATE
                ;       THEM. EACH COUNTER THEN INCREMENTS ON EACH
                ;       CLOCK TICK UNTIL IT OVERFLOWS, AT WHICH TIME
                ;       A COMPLETION ROUTINE IS CALLED TO TAKE THE
                ;       APPROPRIATE ACTION.
                ;
                ; YOU SHOULD ALSO BE AWARE THAT EACH
                ; COMPLETION ROUTINE IS CALLED WITH A VALUE IN AC A
                ; EQUAL TO 2^N WHERE N IS THE VECTOR SLOT NUMBER
                ; OF THAT ROUTINE.
                ; THIS MAKES FOR SIMPLIFIED RLYOFF CALLS
                ;
00BE CE   CNTDN:  LDX     #$0000  ;SET LOOP INDICES
00C1 86           LDAA    #$01
                ;
00C3 6D   CNTDNL: TST     CNTRS,X ;CLOCK EACH COUNTER
00C5 27           BEQ     CNTDNS  ;UNLESS ITS ALREADY
00C7 6C           INC     CNTRS+1,X  ;ZERO
```

```
00C9 26           BNE     CNTDNS
00CB 6C           INC     CNTRS,X
00CD 26           BNE     CNTDNS
          ;
00CF 36           PSHA
00D0 DF           STX     XREGO    ;IF COUNTER OVERFLOWS
00D2 86           LDAA    #MSB SERV  ;TO ZERO, CALL ASSOCIATED
00D4 97           STAA    XREGO    ;SERVICE ROUTINE
00D6 DE           LDX     XREGO
00D8 EE           LDX     LSB SERV,X
00DA 32           PULA
00DB 36           PSHA
00DC AD           JSR     0,X
00DE 4F           CLRA
00DF 97           STAA    XREGO
00E1 DE           LDX     XREGO
00E3 32           PULA
          ;
00E4 08   CNTDNS: INX              ;INCREMENT LOOP INDICES
00E5 08           INX              ;LOOP UNTIL ALL CNTRS SERVICED
00E6 48           ASLA             ; SHIFT BIT TO NEXT PLACE
00E7 8C           CPX     #NCNTRS
00EA 26           BNE     CNTDNL
          ;
00EC 39           RTS
          ;
          ;
          ;
          ;       SERV
          ;
          ;
          ;       VECTOR TABLE OF COMPLETION ROUTINES TO
          ;       BE CALLED ON THE EXPIRATION OF THE
          ;       COUNTERS.
          ;
          ;       "OUR KNOCKING HAS AWAKENED HIM."
          ;
          SERV    =       *
```

```
00ED        WORD   DMSET
00EF        WORD   GXOFF
00F1        WORD   NXOFF
00F3        WORD   RLYOFF  ;DUOFF
00F5        WORD   RLYOFF  ;EROFF
00F7        WORD   RLYOFF  ;ASOFF
00F9        WORD   RLYOFF  ;NGOFF
00FB        WORD   GOOFF
00FD        WORD   EQUIV
00FF        WORD   GOON
0101        WORD   UNON
0103        WORD   DODTIM  ;WHEN DOOR OPEN TOO LONG
       ;
       NSERV  =        *-SERV
       ;
       ;
       ;
       ;      EQUIV
       ;
       ;
       ;      IF THE CONSOLE DOES'T RESPOND TO
       ;      READERS RESPONSE TO CONSOLE'S
       ;      POLL, AND IF DEGRADED MODE IS IN,
       ;      THEN WAIT 10 SECONDS AND:
       ;
       ;      A.) OPERATE GO RELAY IF IDEK AND
       ;      SYSTEM CODE ARE OK.
       ;
       ;      B.) OPERATE NO/GO RELAY OTHERWISE
       ;
       ; "FAITH, HERE'S AN EQUIVOCATOR, THAT COULD SWEAR
       ;  IN BOTH THE SCALES AGAINST EITHER SCALE;
       ;  WHO COMMITTED TREASON ENOUGH FOR GOD'S SAKE,
       ;  YET COULD NOT EQUIVOCATE TO HEAVEN.
       ;
       ;  O, COME IN, EQUIVOCATOR."
       ;
       ;
```

```
0105 96  EQUIV:  LDAA    FPROM    ;CHECK FOR DM OPTION
0107 84          ANDA    #O.DM
0109 27          BEQ     EQDN
         ;
010B 96          LDAA    FPROM    ;CHECK IF IDEK ENTRY OK
010D 84          ANDA    #O.IDEK
010F 27          BEQ     EQS
0111 BD          JSR     COMBIN
0114 24          BCC     CATOR
         ;
0116 96  EQS:    LDAA    DIGTAB+5  ;CHECK SYSTEM CODE
0118 48          ASLA
0119 48          ASLA
011A 48          ASLA
011B 48          ASLA
011C 9A          ORAA    DIGTAB+6
011E 91          CMPA    S.SYS
0120 26          BNE     CATOR
         ;
0122 BD          JSR     OPEN     ;ACTIVATE GO RELAY
         ;                        ;AND START TIMER
0125 39          RTS
         ;
0126 BD  CATOR:  JSR     NGON     ;ACTIVATE NG RELAY
         ;                        ;AND START TIMER
         ;
0129 39  EQDN:   RTS
         ;
         ;
         ;
         ;  OPEN
         ;
         ;
         ;  STARTS DOOR OPEN SEQUENCE.
         ;  TURNS ON ALARM SHUNT, WAKES UP GOON TO TURN
         ;  ON GO RELAY AFTER 50 MILLISECOND DELAY.
         ;
012A 96  OPEN:   LDAA    UNLFLG   ;DOOR MUST BE LOCKED
```

```
012C 27           BEQ     OPN      ;00 OR FF
012E 43           COMA
012F 26           BNE     OPEND
            ;
0131 96     OPN:  LDAA    FPROM    ;CHECK 'AS' OPTION,LEAVE
0133 84           ANDA    #O.AS    ;RELAY OFF UNLESS IN
0135 27           BEQ     OPENS
            ;
0137 86           LDAA    #R.AS    ;TURN ON 'AS' RELAY
0139 BD           JSR     RLYON
            ;
013C BD     OPENS: JSR    NOTIME   ;TURN OFF CONFLICTING TIMERS
013F CE           LDX     #T.50MS  ;WAKE UP GOON IN 50 MS
0142 DF           STX     OPCNTR
            ;
0144 39     OPEND: RTS
            ;
            ;
            ;     GOON
            ;
            ;     TURN ON GO RELAY
            ;     ENABLE EITHER GOOFF OR GXOFF TO
            ;     TURN IT OFF LATER
            ;
            ;     "COME IN, TAILOR. HERE YOU MAY ROAST YOUR GOOSE."
            ;
            ;
0145 86     GOON: LDAA    #R.GO    ;ACTIVATE RELAY
0147 BD           JSR     RLYON
            ;
014A CE           LDX     #GOCNTR  ;SET DELAY ACORDING
014D 96           LDAA    S.VTD    ;TO VTD SWITCHES IF
014F 84           ANDA    #$0F     ;VTD NOT ZERO
0151 27           BEQ     GOONX
0153 BD           JSR     CALCT
0156 39           RTS
            ;
0157 86     GOONX: LDAA   #$FF     ;WHEN VTD IS ZERO,
```

```
0159 97          STAA    GXCNTR  ;ENABLE ROUTINE TO
015B 97          STAA    GXCNTR+1 ;CLOSE GO RELAY AS SOON
          ;              ;AS CARD IS REMOVED
015D 39   GOOND: RTS
          ;
          ;
          ;  GOOFF
          ;
          ; "I PRAY YOU, REMEMBER THE PORTER"
          ;
          ; WHEN 'GO' RELAY TIMES OUT, WE MUST KEEP
          ; THE AS RELAY CLOSED AWHILE LONGER
          ; TIME SPECIFIED BY THE AS/DOD SWITCHES
          ;
015E 86   GOOFF: LDAA    #R.GO
0160 BD          JSR     RLYOFF  ;CLOSE 'GO' RELAY
          ;
0163 96          LDAA    S.AS            ;READ AS/DOD SWITCHES
0165 44          LSRA
0166 44          LSRA
0167 44          LSRA
0168 44          LSRA
0169 4C          INCA    ;AS=0 MEANS SHORTEST TIME
016A 48          ASLA
          ;
          ;  AT THIS POINT, AC CONTAINS 000XXXX0
          ;
016B CE          LDX     #ASCNTR ;LOAD 'AS' COUNTER
016E BD          JSR     CALCT   ;ACCORDING TO SWITCHES
          ;
0171 39          RTS
          ;
          ;
          ;      NGON
          ;
          ;
          ;      TURN ON NG RELAY, SET DELAY COUNTER
          ;
```

```
        ;       "GO AWAY KID--YOU BOTHER ME"
        ;
        ;
0172 96 NGON:   LDAA    FPROM   ;CHECK FOR OPTION
0174 84         ANDA    #O.NG
0176 27         BEQ     NGOND
        ;
0178 86         LDAA    #R.NG   ;TURN ON RELAYS
017A BD         JSR     RLYON
        ;
017D CE         LDX     #NGCNTR ;READ VTD, SET
0180 96         LDAA    S.VTD   ;NGCNTR ACCORDINGLY
0182 84         ANDA    #$OF
0184 27         BEQ     NGONX
0186 BD         JSR     CALCT
0189 39         RTS
        ;
018A 86 NGONX:  LDAA    #$FF    ;IF VTD IS ZERO, RELAY
018C 97         STAA    NXCNTR  ;IS ACTIVATED UNTIL
018E 97         STAA    NXCNTR+1 ;CARD IS PULLED
        ;
        ;
        ;
        ;
        ;       GXOFF
        ;
        ;
        ;       CHECKS IF CARD STILL IN SLOT.
        ;       IF NOT, DISABLES GO IMMEDIATELY
        ;       IF SO, WAKES ITSELF UP ON NEXT CLOCK.
        ;
        ;       "I'LL DEVIL PORTER IT NO LONGER"
        ;
        ;
        GXOFF   =       *
0191 96         LDAA    BUFB    ;CHECK FOR CARD
0193 84         ANDA    #01
0195 26         BNE     STILL
```

```
        ; KEEP IT ON IF A.S. BUTTON IS PUSHED
0197 96         LDAA    S.XXX
0199 84         ANDA    #X.AS
019B 27         BEQ     STILL
        ; GO CLOSE GO AND THEN AS RELAYS
019D 7E         JMP     GOOFF
        ; HERE IF WE WANT TO STAY OPEN
01A0 86 STILL:  LDAA    #$FF    ;WAKE ME UP AT
01A2 97         STAA    GXCNTR  ;NEXT CLOCK TICK
01A4 97         STAA    GXCNTR+1
01A6 39 GXD:    RTS
        ;
        ;
        ;  NXOFF
        ;
        ;
        ;  CHECKS IF CARD STILL IN SLOT.
        ;  IF NOT, DEACTIVATES NG IMMEDIATELY
        ;  IF SO, WAKES ITSELF UP ON NEXT CLOCK
        ;
01A7 96 NXOFF:  LDAA    BUFB    ;CHECK FOR CARD
01A9 84         ANDA    #$01
01AB 26         BNE     NCRD
        ;
01AD 86         LDAA    #R.NG   ;CLOSE RELAY
01AF BD         JSR     RLYOFF
01B2 39         RTS
        ;
01B3 86 NCRD:   LDAA    #$FF    ;WAKE SELF UP ON
01B5 97         STAA    NXCNTR  ;ON NEXT CLOCK TICK
01B7 97         STAA    NXCNTR+1
        ;
01B9 39 NXD:    RTS
        ;
        ;
        ; C.UNLK        UNLOCK THE DOOR AND LEAVE IT UNLOCKED
        ;
        ;  "I HAD THOUGHT TO HAVE LET IN SOME OF ALL
```

```
        ;       PROFESSIONS THAT GO THE PRIMROSE WAY
        ;       TO THE EVERLASTING BONFIRE."
        ;
        ; WE MUST:      SET THE UNLFLG
        ;               TURN ON THE AS RELAY
        ;               THEN TURN ON THE GO RELAY VIA UNON
        ;
        C.UNLK  = *
01BA BD         JSR     ACK     ;THIS IS AN IMPERATIVE
        ;
01BD 96         LDAA    FPROM
01BF 84         ANDA    #O.IMP
01C1 27         BEQ     NUTS
        ;
01C3 86         LDAA    #$01
01C5 97         STAA    UNLFLG          ;MARK DOOR AS UNLOCKED
01C7 96         LDAA    FPROM
01C9 84         ANDA    #O.AS   ;SHOULD WE BOTHER WITH AS?
01CB 27         BEQ     UNS
        ;
01CD 86         LDAA    #R.AS   ;YES
01CF BD         JSR     RLYON
01D2 BD UNS:    JSR     NOTIME  ;TURN OFF EVERYBODY ELSE
01D5 CE         LDX     #T.50MS ;50 MS DELAY
01D8 DF         STX     UNCNTR  ;WAKE UP UNON
01DA 39 NUTS:   RTS
        ;
        ;  UNON
        ;
        ;  "ANON, ANON!"
        ;
        ;  HERE WHEN THE AS RELAY HAS SETTLED
        ;  50 MS AFTER C.UNLK
        ;
        UNON    =       *
01DB 86         LDAA    #R.GO
01DD 7E         JMP     RLYON
        ;
```

```
        ;
        ; LOCK THE DOOR  (AFTER AN UNLK)
        ;
        C.LOCK  =       *
01E0 BD         JSR     ACK
        ;
01E3 96         LDAA    FPROM   ;CHECK OPTION
01E5 84         ANDA    #O.IMP
01E7 27         BEQ     NUTS
        ;
01E9 86         LDAA    #$FF
01EB 97         STAA    UNLFLG  ;SHOW THAT WE ARE LOCKED
01ED 7E         JMP     GOOFF   ;LET SOMEBODY ELSE DO ALL OF
        ; THE WORK, I.E. TURN OFF GO THEN AS
        ;
        ;
        ; NOTIME TURNS OFF A WHOLE SLEW OF COUNTERS
        ; CALL HERE WHEN YOU START A 'GO SEQUENCE'
        ; SO THAT YOUR PREDECESSORS CANNOT INTERFERE WITH YOU
        ;
01F0 CE NOTIME: LDX     #0
01F3 DF         STX     EQCNTR
01F5 DF         STX     GXCNTR
01F7 DF         STX     ASCNTR
01F9 DF         STX     GOCNTR
01FB DF         STX     OPCNTR
01FD 39         RTS
        ;
        ;       RLYOFF
        ;
        ;
        ;       RLYOFF CLOSES THE RELAY INDICATED
        ;       BY MASK IN ACCUM A
        ;
        ;
01FE 9A RLYOFF: ORAA    BUFB
0200 97         STAA    BUFB
        ;
```

```
0202 39          RTS
          ;
          ;
          ;      RLYON   ;TURNS ON A RELAY
          ;              ;BIT MASK E.G. $80 IN AC A
          ;
0203 43   RLYON: COMA
0204 94          ANDA    BUFB
0206 97          STAA    BUFB
0208 39          RTS
          ;
          ;
          ;      DMSET
          ;
          ;
          ;
          ;      PUT SYSTEM INTO DEGRADED MODE WHEN
          ;      DGCNTR TIMES OUT. SHOULD ONLY
          ;      HAPPEN IF NO CONSOLE TRAFFIC FOR
          ;      OVER 30 SECONDS.
          ;
          ; "IF A MAN WERE PORTER OF HELL GATE,
          ;  HE SHOULD HAVE OLD OF TURNING THE KEY."
          ;
0209 86   DMSET: LDAA    #$FF
020B 97          STAA    DMFLG
          ; LOCK THE DOOR
020D 7F          CLR     UNLFLG  ;SHOW THAT IT IS LOCKED
          ;      ;NOTE!>>> THIS STOMPS THE FLAG INTO THE REPORTED
                  STATE!!!!
0210 7E          JMP     GOOFF
          ;
          ;
          ;
          ;      CALCT
          ;
          ;
          ;
          ;      CALCULATE TIMER CONSTANT FROM VALUE
```

```
          ;        IN ACCUM A. ACCUM A CONTAINS TIME IN SECONDS,
          ;        X POINTS TO TIMER.
          ;
          ;
0213 C6   CALCT:   LDAB    #$FF    ;SET TIMER TO MINIMUM VALUE
0215 E7            STAB    0,X
0217 E7            STAB    1,X
0219 4D            TSTA            ;ZERO SECONDS IS A SPECIAL CASE
021A 27            BEQ     CALCTX
          ;
021C E6   CALCTL:  LDAB    1,X     ;SUBTRACT ONE SECOND
021E C0            SUBB    #-T.01S ;EACH TIME THRU LOOP
0220 E7            STAB    1,X
0222 E6            LDAB    0,X
0224 C2            SBCB    #$00
0226 E7            STAB    0,X
          ;
0228 4A            DECA            ;GO THRU LOOP UNTIL
0229 26            BNE     CALCTL  ;ACCUM A COUNTED OUT
022B 39   CALCTX:  RTS             ;RETURN WITH TIMER
          ;                ;CONST. IN X
          ;
          ;        KEYSER
          ;
          ;
          ;        MAIN KEYBOARD SERVICE ENTRY,
          ;        CALL HERE AT RTC TO CHECK KEYBOARD
          ;        CONTINUALLY SHOVES NEW KEYS INTO KEYTAB
          ;        CALLS DEBOUNCE AND STASH ETC..
          ;
          ;
     022CP KEYSER  =       *
022C BD 0236       JSR     DB      ;WHAT HAS BEEN PUSHED?
022F 4D            TSTA            ;FF MEANS NOTHING
0230 2B 03 =       BMI     NOKEY
0232 BD 0251       JSR     STASH   ;PUT INTO MEMORY
          ;
0235 39   NOKEY:   RTS
          ;
```

```
            ;
            ;       DEBOUNCE
            ;
            ; RETURNS # OF KEY IN AC A
            ; RETURNS FF IF NO NEW KEYS THIS TIME
            ;
            ; USES SUBR KEYSCAN
            ;
     0236P  DB      =       *
0236 BD 0278        JSR     KEYSCN  ;GET NEW KEY IN B
0239 96 27Z         LDAA    OLDKEY
023B D7 27Z         STAB    OLDKEY          ;SAVE THIS # FOR NEXT
                                             TIME
            ;               ;A CONTAINS ONLY COPY OF OLD ONE
023D 11             CBA
023E 27 06 =        BEQ     OLDIE
            ; HERE IF WE SEE KEY FOR FIRST TIME
0240 7F 0026        CLR     KEYFLG
0243 86 FF          LDAA   #$FF             ;DON'T ASSIMILATE
                                             UNTIL LATER
0245 39             RTS
            ; HERE IF SEEN AT LEAST ONCE BEFORE
0246 D6 26Z OLDIE:  LDAB    KEYFLG
0248 27 03 =        BEQ     GOODIE
            ; HERE IF SEEN MANY TIMES
024A 86 FF          LDAA    #$FF
024C 39             RTS
            ;
024D 7A 0026 GOODIE: DEC    KEYFLG          ;NO LONGER VIRGIN
0250 39             RTS             ;KEY # IN AC A STILL
            ;
            ;
            ;       STASH   ;PROCESS KEYBOARD CHARS
            ;
            ; IF A NUM, SLIDES IT INTO KEYTAB
            ; AND INCREMENTS KEYCNT
            ; IF CANCEL, CLEARS KEYTAB AND KEYCNT
            ; IF DURESS, SETS DURESF FLAG
```

```
                ; NOTE THAT CANCEL AND DURESS DO NOT GO INTO MEMORY
                ;
                ; CALLED WITH CHAR IN AC A
                ;
        0251P   STASH   =       *
                ; FIRST FOR THE SPECIAL CHECKS
                ;
0251 81 0A              CMPA    #$0A            ;DURESS CHARACTER
0253 27 20 =            BEQ     DURKEY
0255 81 0B              CMPA    #$0B    ;CANCEL CHAR
0257 27 12 =            BEQ     CANCEL
                ; HERE IF IT MUST BE A VALID NUMERAL
                ; SLIDE OLD DATA DOWN TO MAKE ROOM
                ;
0259 D6 22Z             LDAB    KEYTAB+2
025B D7 23Z             STAB    KEYTAB+3
025D D6 21Z             LDAB    KEYTAB+1
025F D7 22Z             STAB    KEYTAB+2
0261 D6 20Z             LDAB    KEYTAB+0
0263 D7 21Z             STAB    KEYTAB+1
                ; NOW INSERT THE NEW ONE
0265 97 20Z             STAA    KEYTAB+0
0267 7C 0024            INC     KEYCNT
026A 39                 RTS
                ;
        026BP   CANCEL  =       *
                ; CLEAR DATA AND COUNT
                ; ASSUMES THEY ARE CONSECUTIVE
                ;
026B 4F                 CLRA
026C CE 0005            LDX     #$05            ;FOUR DIGITS AND ONE
                                                 COUNT
026F A7 1FZ     CANL:   STAA    KEYTAB-1,X
0271 09                 DEX
0272 26 FB =            BNE     CANL
0274 39                 RTS             ;DO NOT STORE ARGUMENT
                ;
        0275P   DURKEY  =       *
```

```
0275 97 25Z          STAA   DURESF          ;MAKE FLAG NON-ZERO
0277 39              RTS
               ;
               ;
               ;     KEYSCAN
               ;
               ; TELLS WHAT KEY IS DOWN
               ; ANSWER IS IN AC B
               ; O THROUGH 11 DESIGNATES KEY
               ; FF MEANS NO KEYS PUSHED
               ;
        0278P  KEYSCN  = *
0278 5F              CLRB           ;START WITH KEY 0
               ;
               ; DETERMINE WHAT ROW THE KEY IS IN
               ;
0279 96 E0           LDAA   ROW0
027B 43              COMA
027C 84 F0           ANDA   #$F0    ;UNUSED BITS
027E 26 15 =         BNE    GOTIT
0280 CB 04           ADDB   #4              ;NEXT ROW STARTS WITH
                                             KEY 4
               ;
0282 96 E1           LDAA   ROW0+1
0284 43              COMA
0285 84 F0           ANDA   #$F0
0287 26 0C =         BNE    GOTIT
0289 CB 04           ADDB   #4
               ;
028B 96 E2           LDAA   ROW0+2
028D 43              COMA
028E 84 F0           ANDA   #$F0
0290 26 03 =         BNE    GOTIT
               ; HERE IF NOW ROWS HAVE KEYS DOWN
0292 C6 FF           LDAB   #$FF
0294 39              RTS
               ;
               ; NOW TO DETERMINE WHICH OF THE FOUR COLUMNS IT IS
```

```
                ; AT THIS POINT, B CONTAINS 0, 4, OR 8
                ; AND A CONTAINS A 'ONE-OF-FOUR' CODE IN THE MSB'S
                ; THE CODE FOR KEY 0 IS 10; KEY 1 IS 20, ETC.
                ;
        0295P   GOTIT   =       *
0295 44                 LSRA
0296 44                 LSRA
0297 44                 LSRA
0298 44                 LSRA
                ; NOW CODE IS THE THE FOUR LSB'S
0299 44         KEYSL:  LSRA                ;PUT A BIT INTO CARRY FLAG
029A 25 03 =            BCS     DONE        ;IF A ONE, THEN WE'RE THROUGH
029C 5C                 INCB                ;NOPE...GO TO NEXT BIT
029D 20 FA =            BRA     KEYSL       ;LOOP UNTIL FIND ONE
                ; NOTE THAT WE ARE GUARANTEED THAT AC IS NON-ZERO!!!
                ; SO WE CAN'T LOOP FOREVER
                ;
029F 39         DONE:   RTS
                ;
                ;
                ;
                ;
                ;  END OF FOREGROUND MODULE
                ;
                ;
02A0            CPYRGT: BYTE    "COPYRIGHT (C)  1976 "
02B4                    BYTE    "RUSCO ELECTRONIC SYSTEMS "
02CD                    BYTE    "GLENDALE, CALIFORNIA "
        02E2P   FOREND  =       *
                ;
                ;
                ;
                ;  BACK
                ;
                ;
                ;  THIS IS THE CONTROLLING PROGRAM FOR THE
                ;  BACKGROUND TASKS.  MOST OF THE EXECUTION
                ;  TIME OF THE PROCESSOR IS SPENT IN THIS
```

```
                ;  ROUTINE CHECKING STATUS BITS
                ;  AND WAITING TO BEGIN ONE OF SEVERAL
                ;  BACKGROUND TASKS.  THE FOLLOWING
                ;  TASKS ARE INITIATED FROM THIS ROUTINE:
                ;
                ;       1.  INITIATE RESPONSE TO CONSOLE INQUIRY
                ;       OR COMMAND.
                ;
                ;       2.  CHECK FOR CARD AND PERFORM ONE OR
                ;       MORE OF THE FOLLOWING TASKS, AS
                ;       APPROPRIATE:
                ;
                ;               A.  IF IN DEGRADED MODE, INITIATE
                ;               DEGRADED ENTRY SEQUENCE.
                ;
                ;               B.  IF IDEK, INITIATE IDEK KEYBOARD
                ;               SCANNING SEQUENCE.
                ;
                ;               C.  IF ELEVATOR, INITIATE FLOOR
                ;               KEYBOARD SCANNING SEQUENCE.
                ;
02E2 8E 0068    BACK:   LDS     #$0068          ;INIT STACK PTR
02E5 BD 0327            JSR     IOSET   ;INITIALIZE I/O DEVICES
                ;
02E8 BD 0314            JSR     CLRRAM  ;INITIALIZE MACHINE STATE
                ;
02EB BD 03E4            JSR     ILKL    ;INIT TO IDEK LOCAL
02EE 86 FE              LDAA    #$FE    ;FLAG LOCAL,REPORTED
02F0 97 1CZ             STAA    LCLFLG
                ;
02F2 86 FC              LDAA    #$FC    ;ENABLE ALL FEATURES
02F4 97 80              STAA    FPROM   ;WHILE DEBUGGING
02F6 86 FF              LDAA    #$FF
02F8 97 81              STAA    FPROM+1
                ;
02FA BD 031D            JSR     DMCLR   ;CLR DEGRADED MODE
                ;
02FD                    PION            ;TURN ON INTERRUPTS
```

```
                ;
02FE 86 34      ALOOP:  LDAA    #$34    ;CLR DEAD MAN
0300 97 A5              STAA    CSRA
                ;
0302 96 1EZ     CHKDM:  LDAA    DMFLG   ;CHECK FOR DEGRADED MODE
0304 27 03 =            BEQ     CHKPL
0306 BD 05B2            JSR     DMSCAN
                ;
0309 86 01      CHKPL:  LDAA    #01     ;WAIT FOR CONSOLE COMMAND
030B 94 A8              ANDA    ACSTAT
030D 27 EF =            BEQ     ALOOP
030F BD 034E            JSR     COMCON
0312 20 EA =            BRA     ALOOP
                ;
                ;
                ;
                ;  CLRRAM
                ;
                ;
                ;  CLEARS ALL RAM FROM 0000 TO 0050
                ;  USED TO INIT RAM ON STARTUP
                ;
0314 CE 0050    CLRRAM: LDX     #$50
0317 6F 00      CLRRML: CLR     0,X
0319 09                 DEX
031A 26 FB =            BNE     CLRRML
031C 39                 RTS
                ;
                ;
                ;
                ;  DMCLR
                ;
                ;
                ;  CLEARS DEGRADED MODE AND INITIALIZES
                ;  DEGRADED MODE COUNTER TO TIME OUT IN
                ;  30 SECONDS
                ;
031D 86 00      DMCLR:  LDAA    #$00    ;CLEAR DM FLAG
```

```
031F 97 1EZ             STAA    DMFLG
                ;
0321 CE EE6C            LDX     #T.30S  ;30 SEC DELAY
0324 DF 00Z             STX     DMCNTR
                ;
0326 39                 RTS
                ;
                ;
                ;
                ; I/O INITIALIZATION ROUTINES
                ;
                ;
0327 7F 00A5    IOSET:  CLR     CSRA    ;ROUTING BIT=0 MEANS DDRS
032A 7F 00A7            CLR     CSRB
032D 86 FF              LDAA    #$FF    ;1 MEANS OUTPUT
032F 97 A4              STAA    BUFA
0331 86 FE              LDAA    #$FE            ;ONE INPUT FOR CARDIN
0333 97 A6              STAA    BUFB
                ; SET CA2 TO 'MANUAL', LOW=BG, HIGH=FG
                ;       (FOR DEADMAN)
                ; SET CA1 TO REACT TO FALLING EDGE OF COIL DATA
0335 86 34              LDAA    #$34            ;$3C FOR FOREGROUND
0337 97 A5              STAA    CSRA
                ; CB2 REACTS TO THE RISING EDGE OF RTC
                ; CB1 IS UNUSED
0339 86 0E              LDAA    #$0E
033B 97 A7              STAA    CSRB
                ; NOW SET INITAL VALUES
                ; NO COILS SELECTED, NO RELAYS ON
033D 86 F0              LDAA    #$F0
033F 97 A4              STAA    BUFA
0341 86 F8              LDAA    #$F8
0343 97 A6              STAA    BUFB
                ;
                ; NOW TO INITIALIZE THE ACIA
                ;
0345 86 FF              LDAA    #$FF            ;*****TOTAL RESET*****
                ;********* NOTE:         THIS DESTROYS ANY CHARS IN
                                         TRANSMISSION********
```

```
0347 97 A8            STAA   ACSTAT
0349 86 16            LDAA   #$16           ;EIGHT BIT CHARS,
                                             1/64 MODE !
034B 97 A8            STAA   ACSTAT
034D 39        RTS2:  RTS
               ;
               ;
               ; COMCON
               ;
               ; PROCESS COMMAND FROM CONSOLE
               ; SHOULD BE CALLED IFF THER IS A CHAR IN THE ACIA
               ; OR POSSIBLY A FRAMING ERROR
               ;
               ; COMCON ALSO RESETS THE DM TIMER TO 30 SEC
               ;
               ; KLUDGE UP TRIVIAL ROUTINES
      034DP    C.CCAK  =      RTS2
      034DP    C.ERR   =      RTS2
      034DP    C.FE    =      RTS2
               ;
      034EP    COMCON  =      *
034E BD 0402          JSR    GETA    ;GET A CHAR FROM THE ACIA
0351 36               PSHA
0352 81 80            CMPA   #$80    ;FRAMING ERROR
0354 27 03 =          BEQ    *+5
0356 BD 031D          JSR    DMCLR
0359 32               PULA
               ; NOW TURN CHAR INTO INDEX TO COMTAB
035A 44               LSRA
035B 44               LSRA
035C 44               LSRA
035D 44               LSRA
035E 48               ASLA   ;2 BYTES PER ADDRESS
               ; AT THIS POINT A CONTAINS 000XXXX0
035F 97 44Z           STAA   XREG1+1 ;LSB (OFFSET)
0361 86 ??            LDAA   #MSB COMTAB
0363 97 43Z           STAA   XREG1   ;MSB TABLE ADDRESS
0365 DE 43Z           LDX    XREG1
```

```
                ; NOW VECTOR THROUGH TABLE TO THE 'SERVICE ROUTINE'
0367 EE ??              LDX     LSB COMTAB,X    ;LSB OF TABLE BASE ADDR
0369 AD 00              JSR     0,X
036B 39                 RTS
                ;
     036CP   COMTAB     =       *
036C                    WORD    C.POLL,C.CCAK,C.ERR,C.ERR
0374                    WORD    C.ERR,C.NG,C.GO,C.ERR
037C                    WORD    C.FE,C.NG.A,C.GO.A,C.LOCK
0384                    WORD    C.UNLK,C.IC,C.ICK,C.ILCL
                ;
                ;
                ; C.GO  GO WITHOUT ACKNOWLEGE
                ;
                ;
038C 96 A6   C.GO:      LDAA    BUFB    ;DO NOTHING IF
038E 84 01              ANDA    #$01            ;CARD NOT STILL IN READER
0390 27 03 =            BEQ     RTS1
0392 BD 012A            JSR     OPEN            ;BEGIN DOOR OPEN SEQUENCE
0395 39      RTS1:      RTS
                ;
                ;
                ; C.GO.A        GO WITH ACK
                ;
     0396P   C.GO.A     =       *
0396 BD 03FC            JSR     ACK
                ;
0399 96 80              LDAA    FPROM
039B 84 08              ANDA    #O.IMP
039D 27 F6 =            BEQ     RTS1
                ;
039F BD 012A            JSR     OPEN            ;SAME AS GO.A
03A2 39                 RTS
                ;
                ;
                ; C.NG  ACTIVATE THE NG RELAY
                ;               NO ACK
                ;
     03A3P   C.NG       =       *
```

```
                ; THE CONSOLE IS NOT EQUIVOCATING
03A3 CE 0000            LDX     #0
03A6 DF 10Z             STX     EQCNTR
                ; DO NOTHING IF CARD NOT STILL IN READER
03A8 96 A6              LDAA    BUFB
03AA 84 01              ANDA    #$01
03AC 27 E7 =            BEQ     RTS1
03AE BD 0172            JSR     NGON            ;START THE NG SEQUENCE
03B1 39                 RTS
                ;
                ;
                ;  C.NG.A       NOGO    WITH ACK
                ;
        03B2P   C.NG.A  =       *
03B2 BD 03FC            JSR     ACK
                ;
03B5 96 80              LDAA    FPROM
03B7 84 08              ANDA    #O.IMP
03B9 27 DA =            BEQ     RTS1
                ;*
03BB BD 0172            JSR     NGON    ;ACTIVATE THE NG RELAY
03BE 39                 RTS
                ;
                ;
                ;
                ;  C.IC
                ;
                ;
                ;  COMMAND IDEK READER TO NO KEYBOARD MODE
                ;
03BF 96 81      C.IC:   LDAA    FPROM+1 ;CHK FOR IDEK OVERRIDE
03C1 84 80              ANDA    #O.IDO  ;OPTION
03C3 27 33 =            BEQ     NOIDO
                ;
03C5 86 01              LDAA    #$01    ;SET NO KBD MODE
03C7 97 1BZ             STAA    KBDFLG
03C9 20 29 =            BRA     NOLCL
                ;
```

```
                ;
                ;  C.ICK
                ;
                ;
                ;  COMMAND IDEK READER TO KEYBD MODE
                ;
03CB 96 81      C.ICK:  LDAA    FPROM+1 ;CHECK FOR IDEK OVERRIDE
03CD 84 80              ANDA    #O.IDO  ;OPTION
03CF 27 27 =            BEQ     NOIDO
                ;
03D1 86 FF              LDAA    #$FF    ;SET KBD MODE
03D3 97 1BZ             STAA    KBDFLG
03D5 20 1D =            BRA     NOLCL
                ;
                ;
                ;  COMMAND READER TO GO TO LOCAL MODE
                ;
                ;
                ;
        03D7P   C.ILCL  =       *
03D7 96 81              LDAA    FPROM+1
03D9 84 80              ANDA    #O.IDO
03DB 27 1B =            BEQ     NOIDO   ;OPTION NOT IN
                ;
03DD BD 03FC            JSR     ACK
03E0 86 01              LDAA    #$01    ;LOCAL, NOT YET REPORTED
03E2 97 1CZ             STAA    LCLFLG
                ;
                ; JSR HERE TO SET CARD/CARD+KEYBOARD
                ; ACCORDING TO LOCAL SWITCH
03E4 96 C3      ILKL:   LDAA    S.IDEK  ;CHECK SWITCH
03E6 84 01              ANDA    #$01
03E8 27 05 =            BEQ     NKB
                ;
03EA 86 00              LDAA    #$00    ;FORCE KEYBD,REPORTED
03EC 97 1BZ             STAA    KBDFLG
03EE 39                 RTS
                ;
```

```
03EF 86 FE    NKB:     LDAA    #$FE     ;FORCE NO KBD,REPORTED
03F1 97 1BZ            STAA    KBDFLG
03F3 39                RTS
                ;
                ;  NOLCL
                ;
                ;
                ;  COMMAND RDR OFF LOCAL MODE
                ;
03F4 86 00    NOLCL:   LDAA    #$00
03F6 97 1CZ            STAA    LCLFLG
03F8 BD 03FC  NOIDO:   JSR     ACK
03FB 39                RTS
                ;
                ;
                ;  ACK
                ;
                ;
                ;  SEND AN ACKNOWLEDGE CHARACTER TO CONSOLE
                ;
03FC 86 10    ACK:     LDAA    #$10
03FE BD 0414           JSR     PUTA
0401 39                RTS
                ;
                ;
                ; GETA  GET A CHARACTER FROM THE ACIA
                ; RETURNS CHAR IN AC A
                ; RETURNS 80 IF NO CHAR READY, OR ERROR
                ;*
         0402P  GETA     =       *
0402 96 A8             LDAA    ACSTAT
0404 85 01             BITA    #$01             ;READY????
0406 27 09 =           BEQ     ACBAD
0408 85 30             BITA    #$30             ;ERROR???
040A 26 03 =           BNE     ACJUNK
040C 96 A9             LDAA    ACDATA
040E 39                RTS
                ;
```

```
040F 96 A9    ACJUNK: LDAA    ACDATA  ;GET RID OF OFFENDER
0411 86 80    ACBAD:  LDAA    #$80
0413 39               RTS
              ;
              ;
              ; PUTA  OUTPUT A CHARACTER TO THE ACIA
              ; CALLED WITH A CHAR IN AC A
              ;
              ; NORMALLY CALLED WITH ACIA KNOWN TO BE 'READY'
              ; BUT WILL WAIT IF NOT READY
              ;
        0414P PUTA    =       *
0414 36               PSHA
              ;
0415 86 34            LDAA    #$34    ;CLR DEADMAN
0417 97 A5            STAA    CSRA
              ;
0419 96 A8    PUTL:   LDAA    ACSTAT
041B 85 02            BITA    #$02    ;XMTR READY?
041D 27 FA *          BEQ     PUTL
              ;
041F 32               PULA
0420 97 A9            STAA    ACDATA
0422 39               RTS
              ;
              ;****************************************************
               *******************
              ;
              ;               CARD READER
              ;
              ;****************************************************
               *******************
              ;
              ;
              ;       THIS SET OF ROUTINES READS THE MAGNETS,
              ; ASSEMBLES BITS INTO 4-BIT DIGITS
              ; AND STORES THEM ONE TO A WORD AT DIGTAB
              ;
              ;
```

```
0423 CE 0084  CARDRD: LDX     #SCNTAB ;POINTS AT COIL ADDRESSES
0426 DF 45Z           STX     SCNPTR
0428 CE 0031          LDX     #DIGTAB
042B DF 47Z           STX     DIGPTR  ;POINTS TO PLACE TO KEEP THE
                                        DIGITS
      042DP   CRDRDL  =       *
              ;
              ; HERE TO READ THE NEXT DIGIT OF THE CARD
              ;
              ;       LDX     DIGPTR
              ;               ;ASSUME X CONTAINS DIGPTR
042D 8C 0038          CPX     #DIGTAB+7        ;STOP AFTER 7 DIGITS
0430 26 01 =          BNE     CRDOIT
0432 39               RTS              ;ALL DIGITS ACCUMULATED
              ;
0433 C6 10    CRDOIT: LDAB    #$10             ;WILL CARRY AFTER 4
                                                ITERATIONS
      0435P   BITRDL  = *
              ; HERE TO READ ONE BIT AND INCLUDE IT IN DIGIT
              ;
0435 BD 0447          JSR     CRDSCN  ;SCAN CARD FOR BIT
0438 59               ROLB             ;ROLL CARRY BIT INTO B
0439 7C 0046          INC     SCNPTR+1         ;UPDATE BIT INDEX LSB
043C 24 F7 =          BCC     BITRDL  ;IF KLUDGEY FLAG BIT CARRIED OUT
              ; WE HAVE A DIGIT
              ; STORE IT IN RAM
              ;
043E DE 47Z           LDX     DIGPTR
0440 E7 00            STAB    0,X
0442 08               INX              ;UPDATE STROAGE POINTER
0443 DF 47Z           STX     DIGPTR  ;SAFEKEEPING IN RAM
0445 20 E6 =          BRA     CRDRDL  ;GO GET ANOTHER DIGIT
              ;
              ;
              ;
              ; CRDSCN:       CHECKS MAGNET BIT
              ;
              ;
```

```
                 ; CALL WITH INDEX INTO COIL ADDR TABLE IN SCNPTR
                 ; SETS CARRY BIT ACCORDING TO RESULT
                 ;
0447 86 F0       CRDSCN: LDAA  #$F0              ;CLEAR COILS
0449 97 A4               STAA  BUFA
044B 01                  NOP           ;WAIT FOR COILS TO SETTLE
044C 01                  NOP
044D 01                  NOP
044E 96 A4               LDAA  BUFA              ;CLR PIA EDGE DETECTOR
0450 DE 45Z              LDX    SCNPTR ;PTR FOR THIS BIT
                 ;
0452 07                  TPA           ;DISABLE INTERRUPTS DUE
0453 36                  PSHA          ;TO CRITICAL TIMING
0454                     PIOFF
                 ;
0455 A6 00               LDAA  0,X               ;GET COIL ADDRESS FROM
                                                  FPROM
0457 97 A4               STAA  BUFA              ;AND TURN ON COIL
0459 01                  NOP
045A 01                  NOP
045B 01                  NOP
045C 01                  NOP
045D 01                  NOP           ;WAIT FOR COIL RESPONSE
045E 01                  NOP
045F 01                  NOP           ;SET CARRY BIT ACCORDING TO
0460 96 A5               LDAA  CSRA              ;RESPONSE ON CRAT
0462 2B 08 =             BMI    CRDSC
                 ;
0464 32                  PULA          ;RESTORE INTERRUPT STATUS
0465 06                  TAP
0466 86 F0               LDAA   #$F0 ;TURN OFF COILS
0468 97 A4               STAA   BUFA
046A 0D                  SEC           ;NORTH SPOT--SET CARRY
046B 39                  RTS
                 ;
046C 32          CRDSC:  PULA          ;RESTORE INTERUPT STATUS
046D 06                  TAP
046E 86 F0               LDAA   #$F0 ;TURN OFF COILS
```

```
0470 97 A4          STAA    BUFA
0472 0C             CLC             ;SOUTH SPOT--CLR CARRY
0473 39             RTS
          ;
          ;*****************************************************
           *****************
          ;
          ;
          ;  POLL HANDLER
          ;
          ;
          ;*****************************************************
           *****************
          ;
          ;
          ;  THIS ROUTINE HANDLES ALL RESPONSES TO POLL
          ;  COMMANDS FROM THE CONSOLE.  ON RECEIPT OF
          ;  SUCH A COMMAND, THIS ROUTINE WILL ARRANGE
          ;  TO DO ONE OF THE FOLLOWING:
          ;
          ;       1.  XMIT ANY CHANGES IN CONDITION
          ;       (DOD, TAMPER, LOCK, ETC.)
          ;
          ;       2.  IF NO CONDITION CHANGES AND THERE
          ;       IS A CARD IN THE READER AND ALL KEYBD
          ;       DATA REQUIRED (IF ANY) HAS BEEN
          ;       COLLECTED, XMIT CARD DATA
          ;
          ;       3.  IF NO CONDITION CHANGES AND NOT READY
          ;       WITH CARD DATA, TRANSMIT A POLL ACK
          ;       CHARACTER
          ;
          ; NOTE THAT ONLY ONE CONDITION CHANGE OR
          ; CARD-IN MESSAGE CAN BE SENT PER POLL.
          ; CONDITION CHANGES HAVE PRIORITY OVER
          ; CARD DATA, AND ARE THEMSELVES ORDERED
          ; ACCORDING TO PRIORITY.
          ;
```

```
        0474P  C.POLL  =        *
               ;
               ;  CHECK TAMPER SWITCH CONDITION CHANGE
               ;
0474 96 18Z    FTAMP:  LDAA     TMPFLG  ;NOTE TAMPER SWITCH
0476 81 01             CMPA     #$01    ;OPEN TRANSITION
0478 26 08 =           BNE      FTAMP1
047A 86 FE             LDAA     #$FE
047C 97 18Z            STAA     TMPFLG
047E 86 80             LDAA     #$80
0480 20 64 =           BRA      XMITC
               ;
0482 81 FF     FTAMP1: CMPA     #$FF    ;NOTE TAMPER SWITCH
0484 26 07 =           BNE      FDOD    ;CLOSED TRANSITION
0486 7F 0018           CLR      TMPFLG
0489 86 80             LDAA     #$80
048B 20 59 =           BRA      XMITC
               ;
               ;
               ;  CHECK DOOR TO SEE IF OPEN OR CLOSED
               ;
048D 96 19Z    FDOD:   LDAA     DODFLG
048F 81 01             CMPA     #$01    ;HAS DOOR BEEN OPENED?
0491 26 08 =           BNE      FDOD1
0493 86 FE             LDAA     #$FE
0495 97 19Z            STAA     DODFLG  ;SHOW IT'S BEEN REPORTED
0497 86 20             LDAA     #$20
0499 20 4B =           BRA      XMITC
               ;
049B 81 FF     FDOD1:  CMPA     #$FF
049D 26 07 =           BNE      FUNK    ;HAS DOOR BEEN CLOSED?
049F 7F 0019           CLR      DODFLG  ;SHOW IT'S BEEN REPORTED
04A2 86 10             LDAA     #$10
04A4 20 40 =           BRA      XMITC
               ;
               ;  CHECK DOOR FOR LOCK OR UNLOCK
               ;
04A6 96 1AZ    FUNK:   LDAA     UNLFLG
```

```
04A8 81 01                CMPA    #$01    ;HAS DOOR BEEN UNLOCKED?
04AA 26 08 =              BNE     FLOCK
04AC 86 FE                LDAA    #$FE
04AE 97 1AZ               STAA    UNLFLG
04B0 86 40                LDAA    #$40
04B2 20 32 =              BRA     XMITC
                  ;
04B4 81 FF        FLOCK:  CMPA    #$FF    ;HAS DOOR BEEN LOCKED?
04B6 26 07 =              BNE     FKBD
04B8 7F 001A              CLR     UNLFLG
04BB 86 30                LDAA    #$30
04BD 20 27 =              BRA     XMITC
                  ;
                  ;
                  ;  IDEK CONDITION CHANGES
                  ;
04BF 96 1BZ       FKBD:   LDAA    KBDFLG
04C1 81 01                CMPA    #$01    ;GONE CARD ONLY?
04C3 26 08 =              BNE     FKBD1
04C5 86 FE                LDAA    #$FE
04C7 97 1BZ               STAA    KBDFLG
04C9 86 50                LDAA    #$50
04CB 20 19 =              BRA     XMITC
                  ;
04CD 81 FF        FKBD1:  CMPA    #$FF    ;GONE CARD+KEYBOARD?
04CF 26 07 =              BNE     FLCL
04D1 7F 001B              CLR     KBDFLG
04D4 86 60                LDAA    #$60
04D6 20 0E =              BRA     XMITC
                  ;
04D8 96 1CZ       FLCL:   LDAA    LCLFLG
04DA 81 01                CMPA    #$01    ;HAS IDEK GONE LOCAL?
04DC 26 1D =              BNE     FCARD
04DE 86 FE                LDAA    #$FE
04E0 97 1CZ               STAA    LCLFLG
04E2 86 70                LDAA    #$70
04E4 20 00 =              BRA     XMITC
                  ;
```

```
                ;
                ;
                ;  XMITC
                ;
                ;
                ;  THIS ROUTINE SENDS THE MESSAGE NOTIFYING THE
                ;  CONSOLE OF A CONDITION CHANGE
                ;
                ;  CALLED WITH CONDITION CHANGE CODE IN A
                ;
                ;
04E6 36         XMITC:  PSHA            ;SAVE ACC A
                ;
04E7 96 81              LDAA    FPROM+1 ;XMIT DEVICE TYPE
04E9 48                 ASLA
04EA 48                 ASLA
04EB 48                 ASLA
04EC 48                 ASLA
04ED BD 0414            JSR     PUTA
                ;
04F0 32                 PULA            ;XMIT CHANGE CODE
04F1 BD 0414            JSR     PUTA
                ;
04F4 39                 RTS
                ;
                ;
                ;
                ;  PACK
                ;
                ;
                ;  ROUTINE TO SEND ACKNOWLEDGE CHARACTER
                ;  TO CONSOLE IF NOTHING WORTH REPORTING
                ;  HAS HAPPENED.
                ;
04F5 86 FF      PACK:   LDAA    #$FF
04F7 BD 0414            JSR     PUTA
04FA 39                 RTS
                ;
```

```
                 ;
                 ;
                 ;  FCARD
                 ;
                 ;
                 ;  IF NO CONDITION CHANGES TO REPORT,
                 ;  CHECK IF THERE IS A CARD IN READER.
                 ;  IF SO, WE MUST FIGURE OUT WHAT KIND
                 ;  OF A READER WE ARE AND BRANCH TO
                 ;  THE APPROPRIATE SERVICE ROUTINE.
                 ;
04FB 96 1FZ      FCARD:  LDAA    CRDFLG  ;CHECK IF UNPROCESSED
04FD 81 01               CMPA    #$01    ;CARD IN READER
04FF 26 F4 =             BNE     PACK    ;IF NOT, SEND ACK & QUIT
                 ;
0501 96 80               LDAA    FPROM   ;CHECK IF ELEVATOR
0503 84 02               ANDA    #O.ELEV ;READER
0505 26 08 =             BNE     FELEV
                 ;
0507 96 80               LDAA    FPROM   ;CHECK IF IDEK RDR
0509 84 01               ANDA    #O.IDEK
050B 26 15 =             BNE     FIDEK
                 ;
050D 20 5E =             BRA     FSTAND  ;MUST BE STNDRD RDR
                 ;
                 ;
                 ;
                 ;  FELEV
                 ;
                 ;
                 ;  ACCUMULATE AND TRANSMIT ELEVATOR
                 ;  MESSAGE
                 ;
050F 96 25Z      FELEV:  LDAA    DURESF  ;QUIT IF FLOOR NUMBER
0511 27 E2 =             BEQ     PACK    ;NOT KEYED IN
                 ;
0513 BD 056D             JSR     FSTAND  ;DO STANDARD TASKS
                 ;
```

```
0516 96 21Z          LDAA   KEYTAB+1
0518 48              ASLA
0519 48              ASLA
051A 48              ASLA
051B 48              ASLA
051C 9A 20Z          ORAA   KEYTAB
051E BD 0414         JSR    PUTA    ;TRANSMIT FLOOR NUMBER
               ;
0521 39              RTS
               ;
               ;
               ;
               ;  FIDEK
               ;
               ;
               ;  ACCUMULATE AND TRANSMIT IDEK MESSAGE
               ;  IN RESPONSE TO A POLL
               ;
0522 96 1BZ    FIDEK: LDAA  KBDFLG  ;IMITATE STNDRD RDR IF
0524 26 47 =         BNE    FSTAND  ;NOT IN KBD MODE
               ;
0526 96 24Z          LDAA   KEYCNT  ;IGNORE UNTIL 4 DIGITS
0528 81 04           CMPA   #$04    ;HAVE BEEN ENTERED
052A 2B C9 =         BMI    PACK
               ;
052C 86 50           LDAA   #$50    ;XMIT HEADER BYTE
052E BD 0414         JSR    PUTA
               ;
0531 BD 0423         JSR    CARDRD  ;READ CARD
               ;
0534 BD 059A         JSR    FRTL    ;RESTART ERROR COUNT IF
               ;                    ;THIS CARD NOT SAME AS LAST
               ;
0537 BD 064C         JSR    COMBIN  ;COMBINE AND PERMUTE
               ;                    ;KEYBOARD ENTRY
               ;
053A 96 31Z          LDAA   DIGTAB  ;GET FIRST DATA DIGIT
```

```
053C 25 27 =            BCS     FIDOK
                ; HERE IF PASSWO BAD
053E BD 0614            JSR     ERRTRY   ;INC ERR COUNT
0541 8A F0              ORAA    #$F0     ;OR IN BAD ID FLAG
0543 BD 0414            JSR     PUTA     ;OUTPUT 2ND BYTE
                ;
0546 CE 0001    FID:    LDX     #$0001   ;OUTPUT REST OF CARD DATA
0549 A6 31Z     FIDL:   LDAA    DIGTAB,X ;MUST PACK DATA, TWO
054B 08                 INX              ;DIGITS PER BYTE
054C 48                 ASLA
054D 48                 ASLA
054E 48                 ASLA
054F 48                 ASLA
0550 AA 31Z             ORAA    DIGTAB,X
0552 BD 0414            JSR     PUTA
0555 08                 INX
0556 8C 0007            CPX     #$07
0559 26 EE =            BNE     FIDL
                ;
055B 86 FE              LDAA    #$FE     ;FLAG CARD AS PROCESSED
055D 97 1FZ             STAA    CRDFLG
055F CE FA24            LDX     #T.10S   ;CONSOLE MUST RESPOND
0562 DF 10Z             STX     EQCNTR   ;WITHIN TIME LIMIT
                ;
0564 39                 RTS
                ;
0565 BD 0414    FIDOK:  JSR     PUTA     ;IF ID OK, CHECK DURESS
0568 BD 0637            JSR     DURESS
056B 20 D9 =            BRA     FID
                ;
                ;
                ;
                ;  FSTAND
                ;
                ;
                ;  ACCUMULATE AND TRANSMIT CARD DATA FROM
                ;  STANDARD READER IN RESPONSE TO A POLL
                ;
```

```
056D 96 81    FSTAND: LDAA   FPROM+1 ;OUTPUT HEADER BYTE
056F 48               ASLA
0570 48               ASLA
0571 48               ASLA
0572 48               ASLA
0573 BD 0414          JSR    PUTA
                 ;
0576 BD 0423          JSR    CARDRD  ;READ CARD
                 ;
0579 86 00            LDAA   #$00
057B CE 0000          LDX    #$0000  ;OUTPUT CARD DATA
057E AA 31Z   FSTL:   ORAA   DIGTAB,X
0580 BD 0414          JSR    PUTA
0583 08               INX
0584 A6 31Z           LDAA   DIGTAB,X
0586 48               ASLA
0587 48               ASLA
0588 48               ASLA
0589 48               ASLA
058A 08               INX
058B 8C 0008          CPX    #$08
058E 26 EE =          BNE    FSTL
                 ;
0590 86 FE            LDAA   #$FE    ;FLAG CARD AS PROCESSED
0592 97 1FZ           STAA   CRDFLG
0594 CE FA24          LDX    #T.10S  ;CONSOLE MUST RESPOND
0597 DF 10Z           STX    EQCNTR  ;WITHIN TIME LIMIT
                 ;
0599 39               RTS
                 ;
                 ;
                 ;
                 ;  FRTL
                 ;
                 ;
                 ;  FRTL CHECKS TO SEE IF THIS CARD IS THE SAME
                 ;  AS THE LAST ONE.  IF IT IS NOT, IT STORES
                 ;  THIS CARD'S NUMBER AND CLEARS THE COUNT
```

```
                ;  HOLDING THE NUMBER OF ERROR ENTRY ATTEMPTS
                ;
059A CE 0007    FRTL:   LDX     #$0007  ;CHK IF THIS CRD
059D A6 30Z     FRTLL:  LDAA    DIGTAB-1,X ;SAME AS LAST
059F A1 39Z             CMPA    RTLBUF-1,X
05A1 26 04 =            BNE     FRL
05A3 09                 DEX
05A4 26 F7 =            BNE     FRTLL
05A6 39                 RTS
                ;
05A7 A6 30Z     FRL:    LDAA    DIGTAB-1,X ;IF A NEW CARD
05A9 A7 39Z             STAA    RTLBUF-1,X ;SAVE IT'S NUMBER
05AB 09                 DEX
05AC 26 F9 =            BNE     FRL
                ;
05AE 7F 0039            CLR     NTRIES  ;CLEAR ERROR COUNT
05B1 39                 RTS
                ;
                ;*****************************************************
                ******************
                ;
                ;
                ;  DEGRADED MODE SCANNER
                ;
                ;
                ;*****************************************************
                ******************
                ;
                ;
                ;
                ;
                ;  DMSCAN
                ;
                ;
                ;  CHECK IF THERE IS A CARD IN READER.
                ;  IF SO, WE MUST FIGURE OUT WHAT KIND
                ;  OF A READER WE ARE AND BRANCH TO
                ;  THE APPROPRIATE SERVICE ROUTINE.
```

```
                ;
05B2 96 1FZ    DMSCAN: LDAA    CRDFLG  ;CHECK IF UNPROCESSED
05B4 81 01             CMPA    #$01    ;CARD IN READER
05B6 27 01 =           BEQ     DMS
05B8 39        DMQUIT: RTS             ;IF NOT, QUIT
                ;
05B9 96 80     DMS:    LDAA    FPROM   ;CHECK FOR DM OPTION
05BB 84 40             ANDA    #O.DM
05BD 27 F9 =           BEQ     DMQUIT
05C3 26 F3 =           BNE     DMQUIT
                ;
05C5 96 80             LDAA    FPROM   ;CHECK IF IDEK RDR
05C7 84 01             ANDA    #O.IDEK
05C9 26 02 =           BNE     DMIDEK
                ;
05CB 20 23 =           BRA     DMSTND  ;MUST BE STNDRD RDR
                ;
                    ;
                ;
                ;  DMIDEK
                ;
                ;
                ;  CARD-IN SERVICE ROUTINE FOR IDEK
                ;  READERS IF READER IS IN DEGRADED MODE.
                ;  THIS ROUTINE READS KEYBOARD AND CHECKS
                ;  IF PERSONAL CODE IS OK, THEN CALLS DMSTND
                ;  TO SEE IF SYSTEM CODE MATCHES SWITCHES.
                ;
05CD 96 1BZ    DMIDEK: LDAA    KBDFLG  ;IMITATE STNDRD RDR IF
05CF 26 1F =           BNE     DMSTND  ;NOT IN KBD MODE
                ;
05D1 96 24Z            LDAA    KEYCNT  ;IGNORE UNTIL 4 DIGITS
05D3 81 04             CMPA    #$04    ;HAVE BEEN ENTERED
05D5 2B E1 =           BMI     DMQUIT
                ;
05D7 BD 0423           JSR     CARDRD  ;READ CARD
                ;
05DA BD 059A           JSR     FRTL    ;RESTART ERROR COUNT IF
```

```
                    ;           ;THIS CARD NOT SAME AS LAST
                    ;
05DD BD 064C              JSR     COMBIN  ;COMBINE AND PERMUTE
                    ;
05E0 25 0B =              BCS     DMIDOK  ;OPEN IF ID OK
05E2 BD 03A3              JSR     C.NG    ;IF ID BAD ACTIVATE
05E5 BD 0614              JSR     ERRTRY  ;NG SEQUENCE
                    ;
05E8 86 FE                LDAA    #$FE    ;FLAG CARD AS PROCESSED
05EA 97 1FZ               STAA    CRDFLG
                    ;

05EC 39                   RTS
                    ;
                    ;
05ED BD 0637        DMIDOK: JSR   DURESS  ;CHECK IF UNDER DURESS
                    ;
                    ;
                    ;  DMSTND
                    ;
                    ;
                    ;
                    ;  SERVICE ROUTINE FOR THE STANDARD READER IF
                    ;  SYSTEM IS IN DEGRADED MODE.  COMPARES
                    ;  SYSTEM CODE ON CARD WITH THAT ON READER
                    ;  AND ACTIVATES APPROPRIATE RELAY SEQUENCE.
                    ;
05F0 BD 0423        DMSTND: JSR   CARDRD  ;READ CARD
                    ;
05F3 96 C5                LDAA    S.SYS   ;CHECK IF SYS CODE ON
05F5 84 0F                ANDA    #$0F    ;CARD MATCHES SWITCHES
05F7 91 37Z               CMPA    DIGTAB+6
05F9 26 0C =              BNE     DMCLSD
05FB 96 C5                LDAA    S.SYS
05FD 84 F0                ANDA    #$F0
05FF 44                   LSRA
0600 44                   LSRA
0601 44                   LSRA
```

```
0602 44                 LSRA
0603 91 36Z             CMPA    DIGTAB+5
0605 27 05 =            BEQ     DMOPEN
                ;
0607 BD 03A3    DMCLSD: JSR     C.NG    ;NO MATCH--NO GO
060A 20 03 =            BRA     DMSO
                ;
060C BD 038C    DMOPEN: JSR     C.GO    ;IF MATCH, OPEN DOOR
                ;
060F 86 FE      DMSO:   LDAA    #$FE    ;FLAG CARD AS PROCESSED
0611 97 1FZ             STAA    CRDFLG
                ;
0613 39                 RTS
                ;
                ;
                ;
                ;  ERRTRY
                ;
                ;
                ;  COUNTS NUMBER OF IDEK ERRORS FOR A
                ;  PARTICULAR CARD AND CLOSES ERROR RELAY
                ;  IF COUNT EXCEEDS THAT SET ON SWITCHES
                ;
                ;
0614 36         ERRTRY: PSHA
                ;
0615 96 81              LDAA    FPROM+1 ;SEE IF OPTION IN
0617 84 40              ANDA    #O.ERAN
0619 27 1A =            BEQ     ETD
                ;
061B 7C 0039            INC     NTRIES  ;INC ERR COUNT
                ;
061E 96 C3              LDAA    S.IDEK  ;READ NTRIES FROM SWITCHES
0620 44                 LSRA
0621 84 07              ANDA    #$07
0623 4C                 INCA            ;SWITCH=0 MEANS ONE TRY
0624 91 39Z             CMPA    NTRIES
0626 26 0D =            BNE     ETD
```

```
                ;
0628 86 10              LDAA    #R.ERAN ;TURN ON ERR RLY
062A BD 0203            JSR     RLYON
062D 7F 0039            CLR     NTRIES  ;RESET ERR CNTR
0630 CE FE3E            LDX     #T.03S  ;SET RLY TIME DLY
0633 DF 08Z             STX     ERCNTR
                ;
0635 32         ETD:    PULA
0636 39                 RTS
                ;
                ;
                ;
                ;  DURESS
                ;
                ;
                ;  CHECKS DURESS FLAG AND SETS RELAY ACCORDINGLY
                ;
0637 96 81      DURESS: LDAA    FPROM+1
0639 84 20              ANDA    #O.DUR
063B 27 0E =            BEQ     NODUR
063D 96 25Z             LDAA    DURESF
063F 27 0A =            BEQ     NODUR
                ;
0641 86 08              LDAA    #R.DUR
0643 BD 0203            JSR     RLYON
0646 CE FE3E            LDX     #T.03S
0649 DF 06Z             STX     DUCNTR
                ;
064B 39         NODUR:  RTS
                ;
                ;
                ; ROUTINE TO CHECK IDEK PASSWORD
                ; RETURNS WITH CARRY=1 IF OK
                ;         CARRY=0 IF BAD
                ;
                ; CALLS MIX TO RECALCULATE COMBINATION FUNCTION
                ; ASSUMES CARD IMAGE IN DIGTAB
                ; AND PASSWORD IN KEYTAB
                ;
```

```
                ; MIXPTR IS A CALCULATED INDEX INTO DIGTAB
                ; COMBX IS AN INDEX INTO MASTER
                ; WE PROCESS THE DIGITS OF THE PASSWORD IN ORDER
                ;
      064CP     COMBIN  = *
064C BD 066F            JSR     MIX     ;TABLE OF DIGIT INDICES IN
                                         'MASTER'
064F 7F 004B            CLR     MIXPTR  ;MSB OF XREG
0652 CE 0000            LDX     #0      ;FIRST DIGIT OF PASSWORD
0655 A6 28Z     COMBL:  LDAA    MASTER,X
0657 DF 49Z             STX     COMBX
0659 97 4CZ             STAA    MIXPTR+1
065B DE 4BZ             LDX     MIXPTR
                ; NOW X INDICATES WHICH DIGIT OF HIS
                ; CARD FORMS THIS DIGIT OF THE PASSWORD
065D A6 31Z             LDAA    DIGTAB,X
065F DE 49Z             LDX     COMBX
0661 A1 20Z             CMPA    KEYTAB,X
0663 26 08 =            BNE     COMBAD
0665 08                 INX
0666 8C 0004            CPX     #4
0669 26 EA =            BNE     COMBL
066B 0D                 SEC
066C 39                 RTS
                ;
066D 0C         COMBAD: CLC
066E 39                 RTS
                ;
                ;
                ; SUBROUTINE TO PREPARE COMPARAND
                ; TABLE FOR IDEK PERSONAL CODE
                ;
                ; THE IDEK CODE IS 4 DIGITS TAKEN FROM THE CARDHOLDER'S
                ; 5 DIGIT CODE IN AN ARBITRARY ORDER
                ;
                ; SO WE HAVE ALL COMBINATIONS OF FIVE THINGS
                ; TAKEN FOUR AT A TIME
                ; >>>120<<<
```

```
                ; SPECIFY WHICH OF THE FIVE IS MISSING (3 BITS)
                ; >>>24<<<
                ; SPECIFY WHICH OF THE FOUR APPEARS FIRST (2 BITS)
                ; >>>6<<<
                ; SPECIFY WHICH COMES NEXT (2 BITS)
                ; >>>2<<<
                ; TAKE THE REMAINING TWO IN ORDER, OR REVERSED (1 BIT)
                ;
                ; BIT MEANINGS:
                ;  TTHE PERM/COMB SWITCH HAS FOUR FIELDS,
                ; IN THIS FORM: (MMMFFSSX)
                ; WHERE MMM INDICATES WHICH IS MISSING
                ;       FF...WHICH COMES FIRST
                ;       SS...WHICH COMES SECOND
                ;       X...=1 IF LAST SHOULD BE FLIPPED
                ;
                ; ERROR BEHAVIOR:
                ; MMM MUST BE IN THE RANGE 0-4
                ; >>> IF IT ISN'T, IT ACTS LIKE 4
                ; SS MUST BE DIFFERENT FROM FF
                ; >>> IF IT ISN'T, THE SECOND AND THIRD
                ; DIGITS ARE TAKEN FROM THE TWO LOWEST OF THE
                ; THREE REMAINING POSSIBILITIES
                ;***
        066FP   MIX     =       *
066F BD 067C            JSR     MIX1
0672 BD 0699            JSR     MIX2
0675 BD 06C4            JSR     MIX3
0678 BD 06D6            JSR     MIX4
067B 39                 RTS
                ;
                ;
                ; HERE TO TABULATE WHICH FOUR DIGITS ARE USED
                ; RESULT IN MASHER
                ;
067C 96 C4      MIX1:   LDAA    S.COMB
067E 43                 COMA
067F 44                 LSRA
```

```
0680 44            LSRA
0681 44            LSRA
0682 44            LSRA
0683 44            LSRA
0684 97 30Z        STAA    MATCH
            ; NOW MATCH CONTAINS THE 3 MSB'S FROM THE SWITCHES
            ; BUT RIGHT JUSTIFIED
            ; IT DESIGNATES WHICH PERSON DIGIT IS NOT USED
0686 4F            CLRA            ;A CONTAINS DIGIT (0-4)
0687 C6 04         LDAB    #4      ;LOOP COUNTER
0689 CE 002C       LDX     #MASHER ;RESULT TABLE
068C 91 30Z  MIXL: CMPA    MATCH   ;IS THIS THE EXCEPTION?
068E 26 01 =       BNE     MIXS
0690 4C            INCA            ;LET A STEP AHEAD
0691 A7 00   MIXS: STAA    0,X
0693 08            INX
0694 4C            INCA
0695 5A            DECB
0696 26 F4 =       BNE     MIXL
0698 39            RTS
            ;
            ; HERE TO FILL THE FIRST AND SECOND SLOTS
            ; INPUT = MASHER  (MODIFIED)
            ; OUTPUT = MASTER
            ;
            ; AS DIGITS ARE TAKEN FROM MASHER, THEY ARE DELETED
            ; (SET TO NEGATIVE NUMBERS)
            ;
      0699P  MIX2  =       *
0699 7F 004B       CLR     MIXPTR
069C 96 C4         LDAA    S.COMB
069E 43            COMA
069F 44            LSRA
06A0 44            LSRA
06A1 44            LSRA
06A2 84 03         ANDA    #$03
06A4 97 4CZ        STAA    MIXPTR+1
06A6 DE 4BZ        LDX     MIXPTR
```

```
                ; AT THIS POINT, X CONTAINS BITS TAKEN FROM THE SWITCHES
                ; (000XX000) BUT RIGHT JUSTIFIED
06A8 A6 2CZ             LDAA    MASHER,X        ;GRAB SPEDIFIED DIGIT
06AA 97 2BZ             STAA    MASTER+3
06AC 43                 COMA
06AD A7 2CZ             STAA    MASHER,X        ;MARK IT REMOVED
                ;
                ; NOW DO THE SAME TRICK FOR THE SECOND DIGIT OF MASTER
                ;
06AF 96 C4              LDAA    S.COMB
06B1 43                 COMA
06B2 44                 LSRA
06B3 84 03              ANDA    #$03
06B5 97 4CZ             STAA    MIXPTR+1
06B7 DE 4BZ             LDX     MIXPTR
06B9 A6 2CZ             LDAA    MASHER,X
06BB 2A 01 =            BPL     MIX2S
06BD 43                 COMA    ;AC IS NOW POSITIVE
06BE 97 2AZ     MIX2S:  STAA    MASTER+2
06C0 43                 COMA
06C1 A7 2CZ             STAA    MASHER,X
06C3 39                 RTS
                ;
                ;
                ; HERE TO FILL THE LAST TWO SLOTS OF MASTER
                ;
        06C4P   MIX3    =       *
06C4 CE 002B            LDX     #MASHER-1
06C7 08         MIX3L:  INX
06C8 A6 00              LDAA    0,X
06CA 2B FB =            BMI     MIX3L   ;IF DELETED, TRY AGAIN
06CC 97 29Z             STAA    MASTER+1
                ; NOW FOR THE LAST ONE
06CE 08         MIX3LL: INX
06CF A6 00              LDAA    0,X
06D1 2B FB =            BMI     MIX3LL
06D3 97 28Z             STAA    MASTER+0
06D5 39                 RTS
                ;
```

```
                ;
                ; HERE TO SEE IF THE LAST DIGITS SHOULD BE FLIPPED
                ;
        06D6P  MIX4     =       *
06D6 96 C4              LDAA    S.COMB
06D8 43                 COMA
06D9 84 01              ANDA    #1
06DB 27 08 =            BEQ     MIXEND
06DD 96 29Z             LDAA    MASTER+1
06DF D6 28Z             LDAB    MASTER+0
06E1 97 28Z             STAA    MASTER+0
06E3 D7 29Z             STAB    MASTER+1
06E5 39        MIXEND:  RTS
                ;
                ;
                ; END OF FILE
                ;
        06E6P  BAKEND   =       *
```

What is claimed is:

1. A security system in which coded cards are scanned at plural remote terminals to determine whether access will be permitted at plural remote locations, said system including a central processor connected to said plural remote terminals and sequentially polling said plural remote terminals to permit said remote terminals, in sequence, to transmit card data to said central processor, said central processor transmitting entry authorization or denial data to said remote terminals in response to said card data, said system comprising:

- means at one of said remote terminals for producing a start signal in response to transmission of said card data;
- means at said one of said remote terminals for measuring a predetermined elapsed time period after said start signal;
- means responsive to said elapsed time measuring means for producing a mode change signal whenever no entry authorization or denial data is received at said one of said remote terminals during said predetermined elapsed time period; and
- means responsive to said mode change signal for permitting selective access in response to data on said coded cards at said one of said remote terminals without receipt at said terminal of said entry authorization or denial data from said central processor.

2. A security system as defined in claim 1 additionally comprising:

- means at said one of said remote terminals for measuring the time period between receipt of successive polling signals from said central processor; and
- means responsive to said means measuring the time period between successive polling signals for permitting selective access in response to data on said coded cards at said one of said remote terminals without receipt at said terminal of said entry authorization or denial data from said central processor, when the time between successive polling signals exceeds a second predetermined elapsed time period.

3. A security system as defined in claim 1 wherein said predetermined elapsed time period is longer than the time required for said central processor to respond to data from said remote terminals when said central processor is receiving card data from all of said remote terminals.

4. A security system as defined in claim 1 wherein said means for producing a start signal, said means for measuring a predetermined elapsed time period and said means for producing a mode change signal each operate whenever data is transmitted from said one of said remote terminals, regardless of previous production of a mode change signal by said means for producing a mode change signal, so that said security system will permit access at said remote terminal only in response to data from said central processor when data is again received from said central processor.

5. A security system as defined in claim 1 wherein said means for permitting selective access in response to data on said cards responds to different data on said coded cards than does said remote terminal during normal mode operation.

6. A security system as defined in claim 1 wherein said means for permitting selective access comprises:

means for producing a mock entry authorization logic signal; and means for conducting said mock entry authorization logic signal to the logic input of said remote terminal.

7. A security system as defined in claim 1 wherein said means for producing a mode change signal comprises:

means for comparing signals received from said central terminal with signals stored in a data buffer; and means responsive to said comparing means and to said measuring means for producing an output signal when said predetermined time period has elapsed and no signal is received from said central processor which is identical to data in said buffers.

8. A remote terminal for use in a security system which includes other remote terminals and a central processor, said remote unit comprising:

means for reading personnel identification data from a card inserted into said remote unit;

means for transmitting said identification data to said central processor;

means for receiving authorization or denial data from said central processor and for granting or denying access in response to said data; and means for measuring the elapsed time between transmission of said identification data and receipt of said authorization or denial data, and for independently controlling access if said elapsed time exceeds a predetermined value.

9. A remote terminal as defined in claim 8 additionally comprising:

means for measuring the time between receipt of successive polling signals from said central processor; and means for independently controlling access at said remote terminal if said elapsed time between receipt of successive polling signals exceeds a predetermined duration.

10. A remote terminal as defined in claim 8 wherein said measuring means comprises a timer, the operation of which is initiated at the time of operation of said transmitting means.

11. A remote terminal as defined in claim 10 wherein said measuring means further comprises:

means responsive to said timer for producing a degraded mode signal when said timer expires before receipt by said receiving means for authorization or denial data; and means responsive to said degraded mode signal for independently controlling access at said remote terminal.

12. A remote terminal as defined in claim 11 wherein said means for independently controlling access comprises:

means responsive to said degraded mode signal for comparing data from said card with data stored at said remote terminal.

13. A remote terminal as defined in claim 12 wherein said means for comparing compares different data from said card than was transmitted during operation of said transmitting means.

14. A method of controlling access to remote locations during communication failures in a security network which includes a central processor which normally controls access at plural remote terminals in response to identification data sent from said remote terminals to said central processor, comprising:

sending identification data from one of said remote terminals to said central processor in response to actuation of said remote terminal;

measuring at said remote terminal the elapsed time between said sending step and the receipt at said remote terminal of access control data from said central processor; and controlling access at said remote terminal independent of said central processor if said elapsed time exceeds a predetermined value.

15. A method of controlling access as defined in claim 14 additionally comprising:

receiving successive polling signals from said central processor at said remote terminal;

measuring the elapsed time between receipt of successive polling signals at said remote terminal; and controlling access at said remote terminal independent of said central processor if said elapsed time between receipt of successive polling signals exceeds a predetermined value.

16. A method as defined in claim 14 wherein said controlling step comprises:

comparing identification data at said remote terminal with data stored in a buffer at said remote terminal; and permitting access at said remote terminal if said identification data is identical to said stored data.

17. A method as defined in claim 16 wherein said identification data compared in said comparing step is different from said identification data sent to said central processor in said sending step.

* * * * *